US012632972B1

(12) United States Patent
Sun et al.

(10) Patent No.: US 12,632,972 B1
(45) Date of Patent: May 19, 2026

(54) IMAGE REGISTRATION METHOD USING FAST DIFFERENTIAL EVOLUTION SAMPLE CONSENSUS ALGORITHM BASED ON HISTORICAL RECORDS

(71) Applicants: Guangxi University, Nanning (CN); Institute of Geographic Sciences and Natural Resources Research of Chinese Academy of Sciences, Beijing (CN)

(72) Inventors: Yu Sun, Nanning (CN); Fuxiang Wu, Nanning (CN); Zhenrong Zhang, Nanning (CN); Zhenhua Tang, Nanning (CN); Zuofang Yao, Nanning (CN); Fei Yang, Nanning (CN)

( * ) Notice: Subject to any disclaimer, the term of this patent is extended or adjusted under 35 U.S.C. 154(b) by 0 days.

(21) Appl. No.: 19/422,515

(22) Filed: Dec. 17, 2025

(30) Foreign Application Priority Data

Dec. 20, 2024    (CN) .......................... 202411888746.0

(51) Int. Cl.
 *G06K 9/00* (2022.01)
 *G06T 7/33* (2017.01)
(52) U.S. Cl.
 CPC .... *G06T 7/337* (2017.01); *G06T 2207/20048* (2013.01)
(58) Field of Classification Search
 None
 See application file for complete search history.

(56) References Cited

FOREIGN PATENT DOCUMENTS

| CN | 111899286 A | 11/2020 |
| CN | 113643335 A | 11/2021 |
| CN | 114943754 A | 8/2022 |

OTHER PUBLICATIONS

Sun et al., "DESAC: differential evolution sample consensus algorithm for image registration" (Year: 2022).*
Paul et al., "Differential evolution-based sample consensus algorithm for the matching of remote sensing optical images with affine geometric differences" (Year: 2024).*

* cited by examiner

*Primary Examiner* — SJ Park
(74) *Attorney, Agent, or Firm* — Nitin Kaushik

(57) ABSTRACT

An image registration method using a fast differential evolution sample consensus algorithm based on historical records: 1: image acquisition: acquiring a to-be-registered image and a reference image; 2: feature extraction: respectively extracting point features of the to-be-registered image and the reference image by using a SIFT algorithm; 3: feature matching: performing coarse feature matching between the to-be-registered point feature set and the reference point feature set to obtain a sample set; 4: parameter setting; 5: sorting the sample set in ascending order, and initializing a sample inlier archive $A_S$ and a model inlier archive $A_M$; 6: first-time initialization of a population; 7: updating a fast test execution threshold uT; 8: mutation phase; 9: selection phase; 10: mutation operator parameter update; 11: resident initialization of the population; 12: repeating 7-11; 13: selecting the best individual from the population to perform spatial transformation on the to-be-registered image to obtain a registered image.

9 Claims, 11 Drawing Sheets

IMAGE REGISTRATION METHOD USING FAST DIFFERENTIAL EVOLUTION SAMPLE CONSENSUS ALGORITHM BASED ON HISTORICAL RECORDS

CROSS-REFERENCE TO RELATED APPLICATIONS

The application claims priority to Chinese patent application No. 2024118887460, filed on Dec. 20, 2024, the entire contents of which are incorporated herein by reference.

TECHNICAL FIELD

The present invention relates to the technical field of image registration, and in particular, to an image registration method using a fast differential evolution sample consensus algorithm based on historical records.

BACKGROUND

Image registration is a fundamental technique in image processing, and the objective thereof is to overlay and fuse images of similar scenes that contain common regions, in order to generate an information-rich image for subsequent processing or decision-making. Image registration is widely applied in multiple fields and serves as the core technique for image analysis tasks in the fields of remote sensing, medicine, computer vision, etc.

Image registration methods mainly include three categories: image region-based registration methods, image feature-based registration methods, and deep learning-based registration methods. Image feature-based registration methods solve for the transformation model between images by extracting robust features from the images. The image feature-based registration methods are fast and efficient, and insensitive to image variations. Image features may be divided into three major types: point features, line features, and surface features. A Scale-Invariant Feature Transform (SIFT) operator is widely used due to its excellent performance. Image point feature-based registration methods include four steps: feature point extraction, feature point matching, transformation model solving, and image fusion. The task of solving the transformation model is to perform robust estimation, that is, to estimate model parameters from samples corrupted by noise. When a certain sample is heavily corrupted by noise, it does not conform to a hypothesis model, and is called an outlier (an outlying point); otherwise, it is called an inlier. Due to the presence of a large number of outlier values after a feature point matching phase, the challenge in a transformation model solving phase is how to robustly return a consensus set with a relatively large inlier count.

In order to find the correct match between two images, robust estimation is required. The objective of robust estimation is to recover a geometric model from observational data containing errors. Common robust estimation algorithms include Random Sample Consensus (RANSAC), M-estimators, truncated least squares, weighted q-norm estimation, etc. The RANSAC algorithm proposed by Fischler et al. has become a widely used robust estimation algorithm in the field of computer vision due to its implementation simplicity and computational efficiency. Said algorithm can effectively and robustly solve for the transformation model between images from a set of observed values with different errors, even if the sample set contains more than 50% of outliers. Compared with other robust estimators, RANSAC has the characteristics of robustness, efficiency, and simplicity.

A Differential Evolution Sample Consensus (DESAC) algorithm is a random sample consensus (RANSAC) algorithm that directly optimizes the transformation model by applying a differential evolution algorithm, and has relatively strong inlier search capabilities and robustness. However, the time performance of the DESAC algorithm is affected by three factors: the number of verifications for each individual, the population size, and the number of population iterations. A large total number of verifications (the total number of verifications=the number of verifications for each individual×the population size×the number of population iterations) results in poor time performance of the DESAC algorithm, thereby failing to meet the speed requirements for point feature image registration. The specific shortcomings of the DESAC algorithm in terms of time performance are as follows:

(1) Verifying each hypothesis model incurs a significant overhead. When performing a full verification of the hypothesis model, if the total number of samples is large, the running overhead of each full verification is significant.

(2) Resident initialization incurs high calculation overhead but yields low benefits. During the resident initialization phase, the DESAC algorithm initializes individuals in batches and compares and replace same with random individuals in the population. However, most of these replacements are unsuccessful, resulting in high calculation overhead and low benefits.

(3) A fixed scaling factor F leads to inefficient population exploration and development.

Disadvantages of the prior art: the existing DESAC algorithms require relatively long time and exhibit low efficiency when performing image registration tasks.

SUMMARY

The present invention provides an image registration method using a Fast Differential Evolution Sample Consensus (FDESAC) algorithm based on historical records, capable of improving the running speed of the algorithm while ensuring image registration accuracy.

In order to achieve the described objective, the present invention provides an image registration method using an FDESAC algorithm based on historical records, characterized by including the following steps:

step 1: image acquisition: acquiring, by an image acquisition module, a to-be-registered image $I_1$ (x, y) and a reference image $I_2$ (x', y'), and transmitting the two images to a feature extraction module;

step 2: feature extraction: respectively extracting, by the feature extraction module, point features of the to-be-registered image $I_1$ (x, y) and the reference image $I_2$ (x', y') by using a SIFT algorithm, to obtain a to-be-registered point feature set $F_1$ and a reference point feature set $F_2$, and transmitting the two point feature sets to a feature matching module;

step 3: feature matching: performing, by the feature matching module, coarse feature matching between the to-be-registered point feature set $F_1$ and the reference point feature set $F_2$ to obtain a matching point pair set, namely, a sample set S, and transmitting the sample set S to an image registration module using the FDESAC algorithm based on historical records;

$$F_1 = \{f_1, f_2, \ldots, f_a\}, F_2 = \{f_1', f_2', \ldots, f_b'\}, \text{ and } S = \{s_i, s_{2s}, \ldots, s_n\},$$

where a represents the number of to-be-registered point features, b represents the number of reference point features, and n represents the number of matching point pairs;

step 4: parameter setting: setting, by the image registration module, the following parameters according to the sample set S: a SIFT feature distance ratio $D_r$, an inlier determination error threshold t, a population size NP, a weighting factor average value $\mu w$, and a pretest sample count $N_f$, and setting a neighborhood range $Nr=NP/10$ and an initial inlier count $n_f=N_f$;

step 5: sorting, by the image registration module, the sample set S in ascending order according to the SIFT feature distance ratio $D_r$, then calculating BP according to the sample set S, and initializing a sample inlier archive $A_S$ and a model inlier archive $A_M$, where $A_S=\{a_{s,1}, a_{s,2}, \ldots, a_{s,n}\}$, each sample inlier record $a_{s,i}$ stores the number of times a sample $s_i$ is identified as an inlier, $A_M=\{a_{m,1}, a_{m,2}, \ldots, a_{m,n}\}$, and a model inlier record $a_{m,i}$ stores the total inlier count from a historical population that the sample s participates in construction; and calculating a fast test execution threshold uT according to the pretest sample count $N_f$ and the initial inlier count $n_f$;

step 6: first-time initialization of a population: randomly selecting m samples from a top BP*|S| range of the sample set S to initialize an individual $X_i$, testing the individual $X_i$, $i \in [0, NP]$ through a test function Test, to obtain an evaluation index $EI_i$ of the individual $X_i$, and updating the model inlier archive $A_M$;

step 7: updating the fast test execution threshold uT according to the pretest sample count $N_f$ and an inlier count Inlier (X);

step 8: mutation phase: initializing a weight coefficient set $S_w$ of a mutated individual that successfully proceeds to the next iteration, calculating a scaling factor $F_i$ according to the weight coefficient set $S_w$, and calculating the mutated individual $V_i$ according to the scaling factor $F_i$;

step 9: selection phase: testing the mutated individuals $V_i$ through the test function Test, to obtain an evaluation index $EI_y$ of the mutated individual $V_i$;

comparing the evaluation index $EI_i$ of the individual $X_i$ with the evaluation index $EI_y$ of the mutated individual $V_i$, and if the evaluation index $EI_y$ of the mutated individuals $V_i$ is superior to the evaluation index $EI_i$ of the individual $X_i$, replacing the individual $X_i$ with the mutated individual $V_i$, and recording a weighting factor w of the mutated individual $V_i$ into the weight coefficient set $S_w$;

otherwise, randomly selecting m samples from the top BP*|S| range of the sample set S to reinitialize the individual $X_i$, testing the individual $X_i$ through the test function Test, to obtain the evaluation index $EI_i$ of the individual $X_i$ and updating the model inlier archive $A_M$;

step 10: mutation operator parameter update: calculating the average value avg of the weight coefficient set $S_w$, and then calculating the weighting factor average value $\mu w$ according to the average value avg of the weight coefficient set $S_w$;

step 11: resident initialization of the population: calculating the number r of repetitions of resident initialization, if the number $|S_w|$ of successfully mutated individuals equals 0, setting r=3*NP; otherwise, setting $r=3*NP/|S_w|$;

searching for the worst individual X, rat in the population;

if iter>$N_f$ and iter % uT≠0, iter representing the number of iterations, within the top BP*|S| range of the sample set S, randomly selecting m samples with model inlier records satisfying $a_m≠0$ to reinitialize an individual $X_{new}$; otherwise, randomly selecting m samples within the top BP*|S| range of the sample set S to reinitialize the individual $X_{new}$;

testing the individual $X_{new}$ through the test function Test, to obtain an evaluation index $EI_{new}$ of the individual $X_{new}$, and updating the model inlier archive $A_M$; and comparing the evaluation index $EI_{new}$ of the individual $X_{new}$ with the evaluation index $EI_{worst}$ of the worst individual $X_{worst}$, and if the evaluation index $EI_{new}$ of the individual $X_{new}$ is superior to the evaluation index $EI_{worst}$ of the worst individual $X_{worst}$, replacing the worst individual $X_{worst}$ with the individual $X_{new}$;

step 12: repeating steps 7-11, and after reaching a preset number of iterations, proceeding to step 13; and step 13: selection of the best individual from the population: selecting the individual with the best evaluation indexes EI from the population and saving same as the best individual $X_{Best}$, and using the best individual $X_{Best}$ as a spatial geometric transformation model to perform spatial transformation on the to-be-registered image $I_1$ (x, y) to obtain a registered image.

Through the above-mentioned design, firstly, the historical records of population iterations are utilized to skip inferior samples during the verification of the hypothesis model; secondly, when constructing a new hypothesis model through resident initialization, superior samples are utilized to avoid wasting resources on generating useless hypothesis models; and finally, the proposed adaptive scaling factor strategy is utilized to enable the algorithm to focus more on population development, thereby accelerating the convergence speed of the algorithm. Thus, the running speed and efficiency of the algorithm are improved while maintaining image registration accuracy.

During a hypothesis model verification phase, a fast test strategy based on inlier historical records is proposed. This strategy skips samples that are highly likely to be outliers by recording the total number of times each sample has been identified as an inlier, omits the verification of said samples and directly marks said samples as outliers, thereby significantly reducing the running time of the verification algorithm.

During the resident initialization phase, a resident initialization strategy based on inlier historical records within models is proposed. This strategy records the total inlier count for each sample that has historically participated in the construction of hypothesis models, and is utilized to avoid selecting inferior samples for generating hypothesis models, thereby improving the efficiency of the algorithm. In addition, the individuals compared and replaced during the resident initialization are improved from random individuals to the worst individuals in the population, thereby enhancing the effectiveness of resident initialization and accelerating algorithm convergence.

During the mutation phase, the scaling factor/determines the mutation step size of the differential evolution algorithm, and influences the global optimization capability of the algorithm. To reduce the number of population iterations while keeping the accuracy nearly unchanged and to enhance the development weight of the differential evolution algorithm, a scaling factor adaptation strategy based on the number of successful mutations is proposed. The improvement idea of the scaling factor adaptation strategy is as follows:

First, to increase the diversity of the scaling factor/values, a random function needs to be introduced to assign a distinct/base value to each individual. Second, to balance accuracy and speed, the/base value needs to be maintained within an appropriate interval. Third, when the development of the population is relatively strong in a certain generation, the/value needs to be increased to avoid getting trapped in a local optimum; conversely, when exploration is relatively strong, the/value should be appropriately decreased to accelerate population convergence. Therefore, to determine the exploration and development status of the population in a certain generation, it is necessary to associate/with the number of successful mutations from the previous generation. Fourth, to further prevent the population from converging to the local optimum and thus significantly reducing accuracy, it is necessary to slightly increase the/value of the successfully mutated individuals from the previous generation.

In summary, the proposed scaling factor adaption strategy only requires increasing the F value at appropriate time, namely when population development is strong, and for appropriate individuals, namely those that succeeded in mutation in the previous generation, to ensure that accuracy decreases only slightly. Moreover, setting the rest to have lower/values can significantly improve the running speed of the algorithm.

Preferably, in step 2, the SIFT algorithm extracts point features across spaces of various scales, including but not limited to, corner points, edge points, bright spots in dark regions, and dark spots in bright regions.

By extracting point features, the amount of information in an image can be greatly compressed. Feature extraction speed is fast and robust to changes in image grayscale. The SIFT algorithm extracts feature points across spaces of different scales, and image rotation or scaling does not affect the correctness of the feature points. The features extracted through the SIFT algorithm are one-dimensional feature vectors of 128 dimensions, which are highly stable local features.

Preferably, in step 5, the expression for BP calculated according to the sample set S is as follows:

$$Bp = \begin{cases} 1, & |S| \le 100m \\ \dfrac{100m}{|S|}, & |S| > 100m \end{cases}$$

where m is the minimum number of samples required to generate a model, |S| is the total number of samples, and BP represents the proportion of superior samples in the sample set S; and the expression for calculating the fast test execution threshold ET is as follows:

$$uT = \left\lfloor 5 + 0.2 \cdot \left( \frac{n_f}{N_f} \cdot 100\% \right) \right\rfloor.$$

In the described formula, for example, when a predicted inlier ratio $(n_f/N_f) \times 100\% = 40\%$, uT=13, which means that only one generation of full test is performed for every 12 generations of fast tests. Moreover, if the predicted inlier ratio is 5%, uT=6, which means that only one generation of full test is performed for every 5 generations of fast tests.

The setting of the threshold uT is crucial. An increase in the threshold uT leads to an increase in the proportion of the fast tests among all types of tests, enabling extremely fast test during the middle and late stages of the algorithm. However, the disadvantage is that when the inlier ratio is low and the number of samples is large, it is easy to miss true inliers, resulting in an incomplete consensus set returned by the algorithm. Moreover, a decrease in the threshold uT leads to a decrease in the proportion of the fast tests among all the types of tests, and the algorithm frequently verifies all samples, ensuring that there are no omissions in the returned inliers. However, the disadvantage is that the proportion of the raid tests account for only a small proportion, and thus the acceleration effect is not significant. Therefore, the threshold uT needs to be dynamically adjusted to dynamically vary along with the predicted inlier ratio $(n_f/N_f) \times 100\%$ of the FDESAC algorithm.

Preferably, in step 8, the expression for calculating the scaling factor $F_i$ is as follows:

$$F_i = \begin{cases} \text{rand}(0.6,\, 0.75) + 0.3 \times \dfrac{|s_w|}{NP} + 0.01, & \text{if } V_i^{g-1} \text{ mutation succeeds,} \\ \text{rand}(0.6,\, 0.75) + 0.3 \times \dfrac{|s_w|}{NP}, & \text{others.} \end{cases}$$

where rand(0.6, 0.75) is a uniformly distributed random number in an interval (0.6, 0.75), $|S_w|$ is the number of successfully mutated individuals from the previous generation of the population, NP is a population size, and g represents the g-th generation; and the expression for calculating the mutated individual $V_i$ is as follows:

$$V_i = w V_{rand1} + (1 - w) V_{local\_best}$$

$$\begin{cases} V_{rand1} = X_{r1} + F(X_{r2} - X_{r3}) \\ V_{local\_best} = X_{local\_best} + F(X_{r2} - X_{r3}) \end{cases}, (r1 \ne r2 \ne r3)$$

where the i-th mutated individual $V_i$ is obtained by weighting a random mutated individual $V_{rand1}$ and a neighborhood-best mutated individual $V_{local\_best}$ through the weighting factor w, $w \in [0,1]$, F is a scaling factor, and $X_{local\_best}$ is the best neighbor within an index range of the individual $X_i$.

Preferably, in step 10, the expression for calculating the weighting factor average value μw is as follows:

$$\mu w = (1 - 0.1.) * \mu w + 0.1 * avg.$$

7

Preferably, in step 12, the entire iteration process is divided into an archive recording phase and an archive application phase, and the division point between the two phases is a maximum sample inlier record max($a_s$)=NP;

for the archive recording phase, an approach of testing the individual $X_i$, through the test function Test is pretest+ global test;

for the archive application phase, an approach of testing the individual $X_i$ through the test function Test is pretest+fast test;

during execution of the fast test, if the sample inlier record $a_{s,i}$ of the sample $s_i$ is 0, the test thereof is directly skipped, and the sample is directly determined as an outlier; and during the archive application phase, when the population iteration count satisfies iter % uT=0, pretest+fast test is not performed; instead, pretest+global test is performed.

In fast tests, the following low-probability case is not uncommon: after the archive recording phase, the sample inlier record of a certain sample may still remain zero, even though the sample is in fact a valid inlier. To prevent true inliers from being missed during the archive application phase, the FDESAC algorithm based on historical records sets a threshold uT. When the population iteration count satisfies iter % uT=0, pretest+fast test is performed; instead, pretest+global test is performed. This ensures timely detection of any inliers that may have been missed and skipped during fast test.

Preferably, the model inlier archive $A_M$ is updated when samples are drawn to generate a hypothesis model, namely, during population initialization (including three parts: first-time initialization of a population, resident initialization, and a selection phase).

First, the algorithm randomly draws m samples from superior samples within a top BP*100% range to construct a minimum sample subset $S_{min}=\{s_{x1}, s_{x2}, \ldots, s_{xm}\}$, where m is the minimum number of samples required to construct the model; then, a hypothesis model X is generated by using $S_{min}$ and is verified so as to obtain the inlier count Inlier(X); and finally, for each sample $s_{xi}$ participating in construction of the hypothesis model X, the update expression for the model inlier record $a_{m,xi}$ corresponding thereto is as follows:

$$a_{m,xi} = a_{m,xi} + \text{Inlier}(X).$$

Preferably, in step 4, the SIFT feature distance ratio $D_r$ is set to 0.8, and an inlier determination error threshold t is set to 5 pixels.

For the input sample set S, to ensure a sufficient number of inliers, the SIFT feature distance ratio $D_r$ is set to 0.8. Since image registration in this dataset is quite difficult, the inlier determination error threshold t is increased to 5 pixels in order to improve the tolerance in inlier determination.

Preferably, the evaluation indexes EI include two indexes: an inlier count and an inlier error.

When comparing and selecting individuals, priority is given to those with a higher inlier count, i.e., the first indictor; and when the inlier counts are the same, those with lower errors, i.e., the second index are selected.

The present invention has the following beneficial effects:

1. During a hypothesis model verification phase, a fast test strategy based on inlier historical records is proposed. This strategy skips samples that are highly likely to be outliers by recording the total number of times each sample has been identified as an inlier, omits the verification of said samples and directly marks said samples as outliers, thereby significantly reducing the running time of the verification algorithm.

2. During the resident initialization phase, a resident initialization strategy based on inlier historical records within models is proposed. This strategy records the total inlier count for each sample that has historically participated in the construction of hypothesis models, and is utilized to avoid selecting inferior samples for generating hypothesis models, thereby improving the efficiency of the algorithm. In addition, the individuals compared and replaced during the resident initialization are improved from random individuals to the worst individuals in the population, thereby enhancing the effectiveness of resident initialization and accelerating algorithm convergence.

3. During the mutation phase, the scaling factor F determines the mutation step size of the differential evolution algorithm, and influences the global optimization capability of the algorithm. To reduce the number of population iterations while keeping the accuracy nearly unchanged and to enhance the development weight of the differential evolution algorithm, a scaling factor adaptation strategy based on the number of successful mutations is proposed.

BRIEF DESCRIPTION OF DRAWINGS

FIG. 9(a) is the average inlier count, FIG. 9(b) is the maximum inlier count.

DETAILED DESCRIPTION OF THE EMBODIMENTS

The present invention is further described in detail below with reference to the accompanying drawings and the specific embodiments. The following embodiments or accompanying drawings are intended to illustrate the present invention, but are not intended to limit the scope of the present invention.

Figure 1:
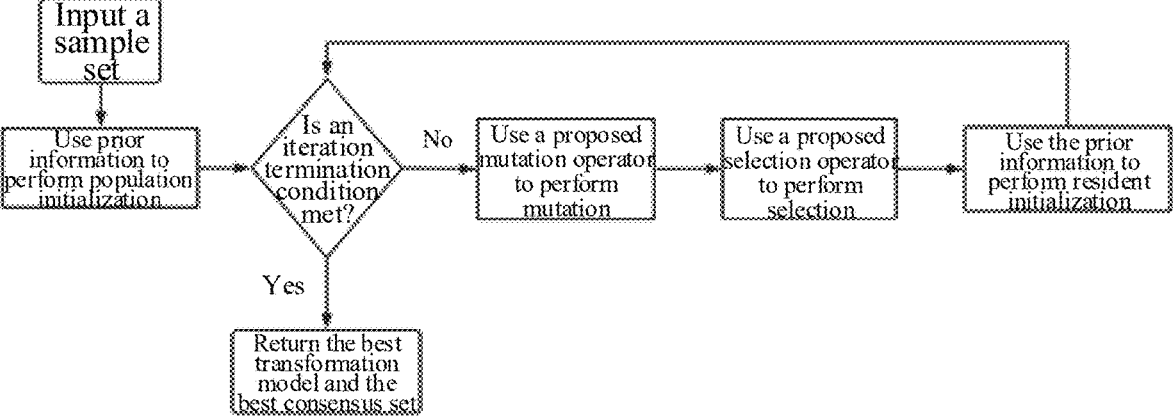
FIG. 1 is a schematic flowchart of an image registration method using a Fast Differential Evolution Sample Consensus (FDESAC) algorithm based on historical records according to the present invention.

As shown in FIG. 1, an image registration method using a Fast Differential Evolution Sample Consensus (FDESAC) algorithm based on historical records includes the following steps:

step 1: image acquisition: acquiring, by an image acquisition module, a to-be-registered image $I_1$ (x, y) and a reference image $I_2$ (x', y'), and transmitting the two images to a feature extraction module;

step 2: feature extraction: respectively extracting, by the feature extraction module, point features of the to-be-registered image $I_1$ (x, y) and the reference image $I_2$ (x', y') by using a SIFT algorithm, to obtain a to-be-registered point feature set $F_1$ and a reference point feature set $F_2$, and transmitting the two point feature sets to a feature matching module;

step 3: feature matching: performing, by the feature matching module, coarse feature matching between the to-be-registered point feature set $F_1$ and the reference point feature set $F_2$ to obtain a matching point pair set, namely, a sample set S, and transmitting the sample set S to an image registration module using the FDESAC algorithm based on historical records;

step 4: parameter setting: setting, by the image registration module, the following parameters according to the sample set S: a SIFT feature distance ratio $D_r$, an inlier determination error threshold t, a population size NP, a weighting factor average value μw, and a pretest sample count $N_f$, and setting a neighborhood range Nr=NP/10 and an initial inlier count $n_f$=$N_f$;

step 5: sorting, by the image registration module, the sample set S in ascending order according to the SIFT feature distance ratio $D_r$, then calculating BP according to the sample set S, and initializing a sample inlier archive $A_S$ and a model inlier archive $A_M$; and $$BP = \begin{cases} 1 & , |S| \le 100m \\ \dfrac{100m}{|S|} & , |S| > 100m \end{cases}$$

where m is the minimum number of samples required to generate a model, and |S| is the total number of samples; and calculating a fast test execution threshold uT according to the pretest sample count $N_f$ and the initial inlier count ne, where the expression thereof is as follows;

$$uT = \left\lfloor 5 + 0.2 \cdot \left( \frac{n_f}{N_f} \cdot 100\% \right) \right\rfloor$$

step 6: first-time initialization of a population: randomly selecting m samples from a top BP*|S| range of the sample set S to initialize an individual X, testing the individual $X_i$, i∈ [0, NP] through a test function Test, to obtain an evaluation index $EI_i$ of the individual $X_i$, and updating the model inlier archive $A_M$;

step 7: updating the fast test execution threshold uT according to the pretest sample count $N^f$ and an inlier count Inlier (X);

step 8: mutation phase: initializing a weight coefficient set $S_w$ of a mutated individual that successfully proceeds to the next iteration, calculating a scaling factor $F_i$ according to the weight coefficient set $S_w$, and calculating the mutated individual $V_i$ according to the scaling factor $F_i$;

where the expression for calculating the scaling factor $F_i$ is as follows:

$$F_i = \begin{cases} rand(0.6, 0.75) + 0.3 \times \dfrac{|S_w|}{NP} + 0.01, & \text{if } V_i^{g-1} \text{ mutation succeeds,} \\ rand(0.6, 0.75) + 0.3 \times \dfrac{|S_w|}{NP}, & \text{others.} \end{cases}$$

where rand(0.6, 0.75) is a uniformly distributed random number in an interval (0.6, 0.75), $|S_w|$ is the number of successfully mutated individuals from the previous generation of the population, NP is a population size, and g represents the g-th generation; and the expression for calculating the mutated individual $V_i$ is as follows:

$$V_i = wV_{rand1} + (1 - w)V_{local\_best}$$
$$\begin{cases} V_{rand1} = X_{r1} + F(X_{r2} - X_{r3}) \\ V_{local\_best} = X_{local\_best} + F(X_{r2} - X_{r3}) \end{cases}, (r1 \ne r2 \ne r3)$$

where the i-th mutated individual V is obtained by weighting a random mutated individual $V_{rand1}$ and a neighborhood-best mutated individual $V_{local\_best}$ through the weighting factor w, w∈ [0,1], F is a scaling factor, and $X_{local\_best}$ is the best neighbor within an index range of the individual $X_i$;

step 9: selection phase: testing the mutated individuals $V_i$ through the test function Test, to obtain an evaluation index $EI_y$ of the mutated individual $V_i$;

comparing the evaluation index $EI_i$ of the individual $X_i$ with the evaluation index $EI_y$ of the mutated individual $V_i$, and if the evaluation index $EI_y$ of the mutated individuals $V_i$ is superior to the evaluation index $EI_i$ of the individual $X_i$, replacing the individual $X_i$ with the mutated individual $V_i$, and recording a weighting factor w of the mutated individual $V_i$ into the weight coefficient set $S_w$;

otherwise, randomly selecting m samples from the top BP*|S| range of the sample set S to reinitialize the individual $X_i$, testing the individual $X_i$ through the test function Test, to obtain the evaluation index $EI_i$ of the individual $X_i$, and updating the model inlier archive $A_M$;

step 10: mutation operator parameter update: calculating the average value avg of the weight coefficient set $S_w$, and then calculating the weighting factor average value μw according to the average value avg of the weight coefficient set $S_w$, where the expression is as follows:

$$\mu w = (1 - 0.1.) * \mu w + 0.1 * avg$$

step 11: resident initialization of the population: calculating the number r of repetitions of resident initialization, if the number |S| of successfully mutated individuals equals 0, setting r=3*NP; otherwise, setting r=3*NP/$|S_w|$;

searching for the worst individual $X_{worst}$ in the population;

if iter>N, and iter % uT≠0, iter representing the number of iterations, within the top BP*|S| range of the sample set S, randomly selecting m samples with model inlier records satisfying $a_m$≠0 to reinitialize an individual $X_{new}$; otherwise, randomly selecting m samples within the top BP*|S| range of the sample set S to reinitialize the individual $X_{new}$;

testing the individual $X_{new}$ through the test function Test, to obtain an evaluation index $EI_{new}$ of the individual $X_{new}$, and updating the model inlier archive $A_M$; and comparing the evaluation index $EI_{new}$ of the individual $X_{new}$ with the evaluation index $EI_{worst}$ of the worst individual $X_{worst}$, and if the evaluation index $EI_{new}$ of the individual $X_{new}$ is superior to the evaluation index $EI_{worst}$ of the worst individual $X_{worst}$, replacing the worst individual $X_{worst}$ with the individual $X_{new}$;

step 12: repeating steps 7-11, and after reaching a preset number of iterations, proceeding to step 13; and step 13: selection of the best individual from the population: selecting the individual with the best evaluation indexes EI from the population and saving same as the best individual $X_{Best}$, and using the best individual $X_{Best}$ as a spatial geometric transformation model to perform spatial transformation on the to-be-registered image $I_1$ (x, y) to obtain a registered image.

Furthermore, in step 2, the SIFT algorithm extracts point features across spaces of various scales, including but not limited to, corner points, edge points, bright spots in dark regions, and dark spots in bright regions.

Figure 2:
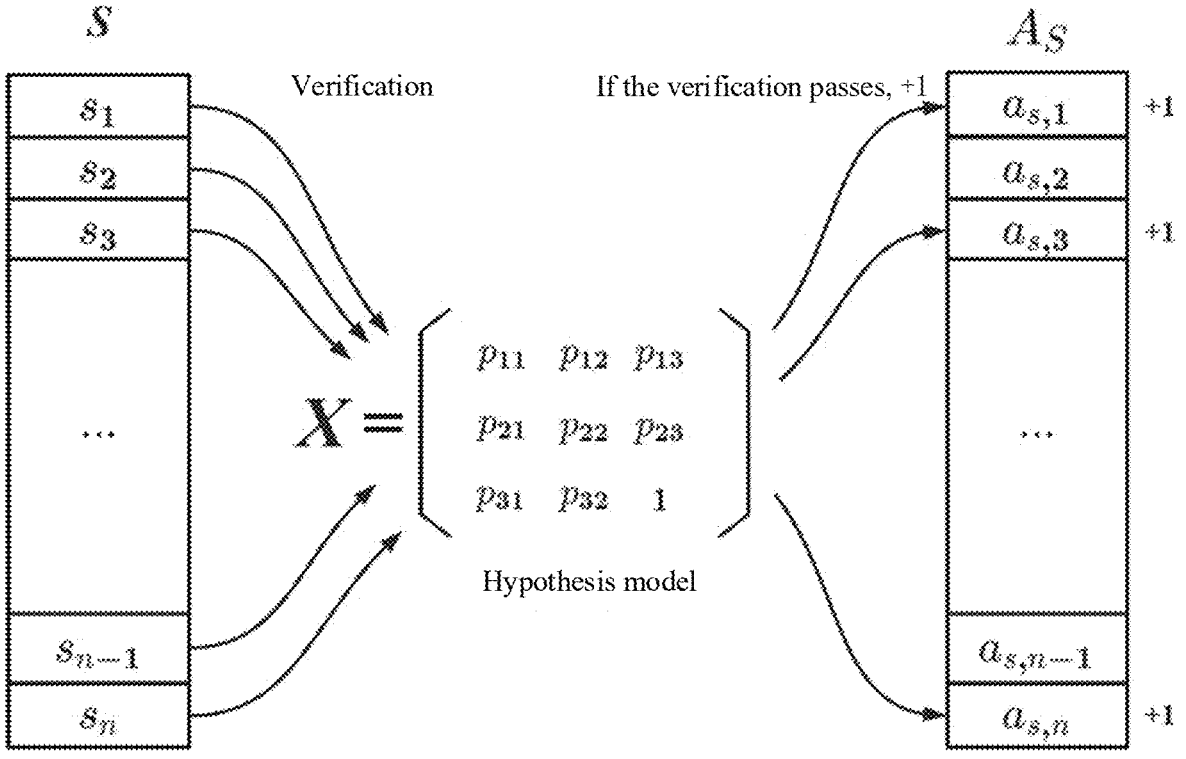
FIG. 2 is a schematic diagram illustrating the update of a sample inlier archive.

Setting and update of the sample inlier archive: first, for the entire sample set $S=\{s_1, s_2, \ldots, s_n\}$, a sample inlier archive $\{a_{s,1}, a_{s,2}, \ldots, a_{s,n}\}$ having a one-to-one correspondence thereto is generated, where each sample inlier record $a_{s,i}$ stores the number of times the sample $s_i$ is identified as an inlier. The FDESAC algorithm needs to perform a verification operation on the hypothesis model, if the sample $s_i$ is determined to be an inlier, the sample inlier record corresponding thereto satisfies $a_{s,i}=a_{s,i}+1$, as shown in FIG. 2.

Figure 3:
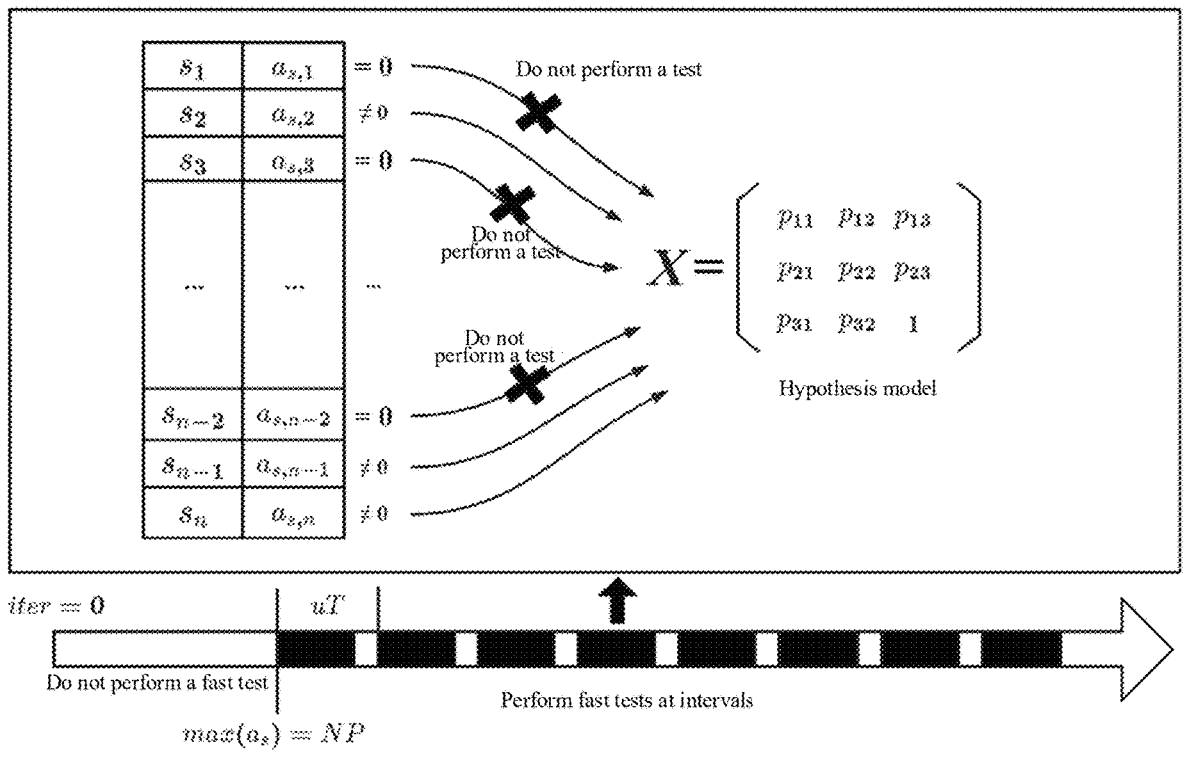
FIG. 3 is a schematic diagram of a fast test strategy.

In step 12, the entire iteration process is divided into an archive recording phase and an archive application phase, and the division point between the two phases is a maximum sample inlier record $max(a_s)=NP$;

for the archive recording phase, an approach of testing the individual $X_i$ through the test function Test is pretest+global test;

for the archive application phase, an approach of testing the individual $X_i$ through the test function Test is pretest+fast test;

during execution of the fast test, if the sample inlier record $s_i$ of the sample $a_{s,i}$ is 0, the test thereof is directly skipped, and the sample is directly determined as an outlier; and during the archive application phase, when the population iteration count satisfies iter % uT=0, pretest+fast test is not performed; instead, pretest+global test is performed, as shown in FIG. 3.

The test function for the FDESAC algorithm is as shown in Algorithm 4-1.

---

Algorithm 4-1 Test function Test

| | |
|---|---|
| Input: | Sample set S, individual X, inlier determination error threshold t, pretest sample count $N_f$, initial inlier count $n_f$, sample inlier archive $A_S$, the number iter of iterations, maximum sample inlier record $maxA_S$, population size NP, fast test execution |
| Output | threshold uT |
| : | Evaluation index $EI_X$ of the individual |
| 1 | Randomly select $N_f$ samples in S; /*pretest starts*/ |
| 2 | pretest inlier counter count = 0; |
| 3 | for $s_i$ in the $N_f$ samples do |
| 4 | calculate an error for $s_i$ through X; |
| 5 | if error < t then |
| 6 | count ++; |
| 7 | if count < $n_f$ then |
| 8 | $EI_X$.num = 0; |
| 9 | $EI_X$.val = 0; |
| 10 | return $EI_X$; /*pretest ends*/ |
| 11 | for i = 0 to |S| − 1 do |
| 12 | if $maxA_S$ > NP && $a_{s,i}$ == 0 && iter % uT != 0 then /*decide which type of test to |
| 13 | perform*/ |
| 14 | continue; |
| 15 | calculate an error for $s_i$ through X; |
| 16 | if error < t then |
| 17 | $EI_X$.num ++; |
| 18 | $EI_X$.val += error; |
| 19 | $a_{s,i}$ ++; /*update the sample inlier archive*/ |
| | return $EI_X$; |

The model inlier archive is also set for each sample. For the entire sample set $S=[s_1, s_2, \ldots, s_n]$, a sample inlier archive $A_M=\{a_{m,1}, a_{m,2}, \ldots, a_{m,n}\}$ having a one-to-one correspondence thereto is set. The model inlier record $a_{m,i}$ stores the total inlier count of the sample participating in construction of a historical hypothesis model.

The sample inlier archive $A_M$ is updated when samples are drawn to generate a hypothesis model, namely, during population initialization. First, the algorithm randomly draws m samples from superior samples within a top BP*100% range to construct a minimum sample subset $S_{min}=\{s_{x1}, s_{x2}, \ldots, s_{xm}\}$, where m is the minimum number of samples required to construct the model; then, a hypothesis model X is generated by using $S_{min}$ and is verified so as to obtain the inlier count Inlier (X); and finally, for each sample $s_{xi}$ participating in construction of the hypothesis model X, the update expression for the model inlier record $a_{m,xi}$ corresponding thereto is as follows:

$$a_{m,xi} = a_{m,xi} + \text{Inlier}(X).$$

Similarly, the sample inlier archive $A_M$ also requires a certain amount of accumulation in the early stages before it can be applied. The archive recording phase thereof is shorter, and is consistent with the adaption cycle of the initial inlier count $n_f$, and the archive application phase can begin after the population iteration count iter is greater than the pretest sample count $N_f$. After entering the archive application phase, intermittent execution is adopted, that is, each time when applying uT−1 generations, application is suspended for one generation.

The resident initialization process applying the model inlier archive is as follows:

(1) To initialize a new individual $X_{new}$, when randomly selecting m samples, the model inlier record $a_{m,xi}$ corresponding to each sample $s_{xi}$ is checked to determine whether it satisfies $a_{m,xi} \neq 0$. If the condition for selecting a new sample is not satisfied, the check is continued until the condition is satisfied. $a_{m,xi}=0$ represents that the model generated under the participation of this sample is likely to be of poor quality, and replacing same can help improve the efficiency of the algorithm.

(2) For the individual to be compared, instead of random selection from the population, the worst individual $X_{worst}$ in the population is selected, $X_{new}$ is compared with $X_{worst}$ and the superior one is retained. This can enhance the effectiveness of resident initialization and accelerate algorithm convergence.

Figure 4:
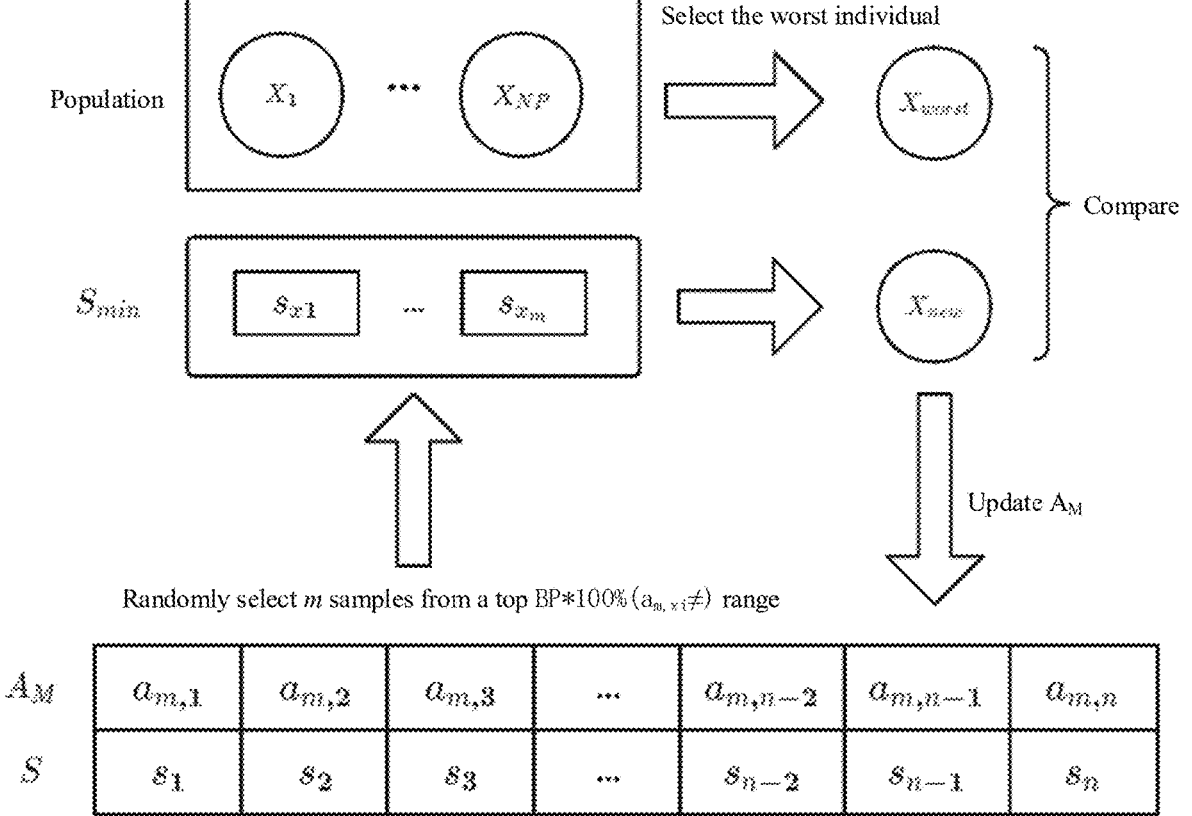
FIG. 4 is a schematic diagram illustrating resident initialization.

(3) Processes (1) and (2) are repeated, where the schematic diagram of resident initialization is as shown in FIG. 4.

The complete pseudocode description of the FDESAC algorithm can be found in Algorithm 4-2.

| Algorithm 4-2 FDESAC algorithm |
|---|

| | |
|---|---|
| Input: | Sample set S, the minimum number m of samples required to generate a model, inlier determination error threshold t, SIFT distance ratio $D_r$, population size NP, weighting |
| Output | factor average value µw, pretest sample count $N_f$ |
| : | Best individual BestX, best consensus set BestConsensus |
| 1 | neighborhood range Nr = NP / 10; |
| 2 | initial inlier count $n_f = N_f$; |
| 3 | sort S in ascending order according to $D_r$; |
| 4 | calculate BP according to formula (3-5); |
| 5 | initialize a sample inlier archive $A_S$ and a model inlier archive $A_M$; |
| 6 | calculate uT according to formula (4-1); |
| 7 | for i = 0 to NP − 1 do /*first-time initialization of population*/ |
| 8 | randomly select m samples from a top BP*ISI range of S to initialize $X_i$; |
| 9 | $EI_i$ = Test(S, $X_i$, t, $N_f$, $n_f$, $A_S$, 0, 0, NP, uT); |
| 10 | update $A_M$ according to formula (4-2); |
| 11 | iter = 0; |
| 12 | while Stop(NP, EI, $n_f$) do /*iteration start*/ |
| 13 | update uT according to formula (4-1); |
| 14 | search for max($\alpha_s$); |
| 15 | initiate $S_w$; |
| 16 | for i = 0 to NP − 1do /*mutation phase*/ |
| 17 | calculate $F_i$ according to formula (4-3); |
| 18 | $w_i$ = randn$_i$(µw, 0.1); |
| 19 | calculate a mutated individual $V_i$ through $F_i$ according to formulas (3-6) and (3-7); |
| 20 | for i = 0 to NP − 1do /*selection phase*/ |
| 21 | $EI_v$ = Test(S, $V_i$, t, $N_f$, $n_f$, $A_S$, iter, max($\alpha_s$), NP, uT); |
| 22 | if compare($EI_v$, $EI_i$) == 1 then |
| 23 | replace $X_i$ ($EI_i$) with $V_i$ ($EI_v$); |
| 24 | record w of $V_i$ into $S_w$; |
| 25 | else if compare($EI_v$, $EI_i$) == 0 then |
| 26 | randomly select m samples from the top BP*ISI range of S to initialize $X_i$; |
| 27 | $EI_i$ = Test(S, $X_i$, t, $N_f$, $n_f$, $A_S$, iter, max($\alpha_s$), NP, uT); |
| 28 | update $A_M$ according to formula (4-2); |
| 29 | if $|S_w|$ = 0 then /*update mutation operator parameters*/ |
| 30 | calculate the average value avg of $S_w$; |
| 31 | µw = (1 − 0.1) * µw + 0.1 * avg; |
| 32 | the number r of repetitions of resident initialization equals 3 * NP; |
| 33 | if $|S_w|$ ≠ 0 then /*resident initialization of the population*/ |
| 34 | r = 3 * NP / $|S_w|$; |
| 35 | search for the worst individual Xworst in the population; |
| 36 | for i = 0 to r do |
| 37 | if iter > $N_f$ && iter % uT != 0 then |
| 38 | randomly select m samples ($\alpha_m \neq 0$) from the top BP*ISI range of S to initialize $X_{new}$; |
| 39 | else |

-continued

---

Algorithm 4-2 FDESAC algorithm

---

40      randomly select m samples from the top BP*|S| range of S to initialize $X_{new}$;
41      $EI_{new}$ = Test(S, $X_{new}$, t, $N_f$, $n_f$, $A_S$, iter, max($\alpha_s$), NP, uT);
42      update $A_M$ according to formula (4-2);
43      if compare ($EI_{new}$, $EI_{worst}$) == 1 then
44      replace $X_{worst}$ ($EI_{worst}$) with $X_{new}$ ($EI_{new}$);
45      iter ++;
46      for i = 0 to NP − 1 do /*select the best individual in the population* /
47      if compare ($EI_i$, $EI_{BestIndex}$) == 1 then
48      BestIndex = i;
49      BestX = $X_{BestIndex}$;
50      calculate BestConsensus through BestX;
51      return BestX and BestConsensus;

---

Next, the present invention is comprehensively evaluated through experiments.

Image dataset: multiple images from an advanced homography estimation dataset are used to solve for a consensus set and a transformation matrix. This dataset provides multiple manually verified correct matching point pairs to more accurately estimate image registration accuracy.

Comparison method: in advanced experiments, the FDESAC algorithm based on historical records in the present invention is compared with a baseline Random Sample Consensus (RANSAC) algorithm, a Preview Model Parameters Evaluation Random Sample Consensus (PERANSAC) algorithm, a Particle Swarm Optimization Random Sample Consensus (PSOSAC) algorithm, an Adaptive Genetic Algorithm Sample Consensus (AGASAC) algorithm, a Combinatorial Strategy-based Differential Evolution (CSDE) algorithm, a Voronoi Neighborhood-based Crowded Differential Evolution (VNCDE) algorithm, and a Differential Evolution Sample Consensus (DESAC) algorithm. All experiments are conducted on an Intel quad-core CPU running at 2.5 GHz with 8 GB of memory.

Parameter setting: for the input sample set S, to ensure a sufficient number of inliers, the SIFT feature distance ratio D, is set to 0.8. Since image registration in this dataset is quite difficult, the inlier determination error threshold t is increased to 5 pixels in order to improve the tolerance in inlier determination. Due to the randomness of the algorithm, all experimental results, other than the maximum inlier count (maximum inlier ratio), are the average value of 100 repeated runs. For comparison algorithms that do not have special improvements in population size NP and scaling factor F, NP is set to 30 and F is set to 0.75. The common parameters of the FDESAC algorithm and the DESAC algorithm are kept consistent: the initial value μw of the weighting coefficient average value is set to 0.5, the neighborhood size Nr is set to NP/10, and the number $N_f$ of pre-test samples is set to 15.

For the AGASAC algorithm, the power factor γ of the control function is set to 10, and the power factor δ of the controlled Gaussian function is set to 1. In the case of a large number of iterations, a high learning rate η in the AGASAC algorithm may cause the selection probability of a certain sample to accumulate excessively, leading to errors of repeated drawing when drawing the minimum sample set. Therefore, η is flexibly set as the reciprocal of the total number |S| of samples, and when η of any sample is greater than 0.2, η of all samples is reset. For the PSOSAC algorithm, the learning rate weights $c_1$ and $c_2$ and the inertia weight ω are set to 0.5. For the DIDE algorithm, in a perspective matrix, the upper and lower bounds for translation dimensions are set to ±1000, and the other dimensions are set to ±2. Due to its mechanism based on virtual population mutation, experiments show that smaller CR values are better, so CR is set to 0.1. The bandwidth for mean-shift clustering is set to 0.01, and $\sigma_{ini}$ and $\sigma_{termin}$ for elite learning are set to 1.0E-7 and 1.0E-10, respectively. For the DEGL algorithm, the weighting factor w thereof selects a random assignment strategy within the range of (0,1) to introduce greater diversity. For the VNCDE, the standard deviation σ required for the mutation of the individual "dominator" is set to 1.0E-7.

Next, three experiments are designed focusing on inlier search performance, transformation matrix accuracy, and iteration performance, with the aim of demonstrating the overall performance of the proposed method and verifying its superiority.

To evaluate the improvement of the FDESAC algorithm over the DESAC algorithm, comprehensive comparison experiments will be conducted thereon. Considering that the inlier count in the population is consistent, the algorithm continues to run without significant improvement, and the iteration stopping condition is set to the consistency of the inlier count.

For the inlier search performance, the following six indexes are set: an average inlier count (average inlier ratio), a maximum inlier count (maximum inlier ratio), the number of hypothesis models, the number of verifications for a single hypothesis model, the number of iterations, and running time. The average inlier count (average inlier ratio) reflects the expected value of the inlier search capability, the maximum inlier count (maximum inlier ratio) reflects the limit of the inlier search capability, and the running time reflects the time performance of the algorithm. These are the main evaluation indexes.

For the transformation matrix accuracy, the following two evaluation indexes are set: an RMSE re-projection error calculated based on the ground truth matching point pairs provided in the dataset, and an average inlier error. Compared with a perspective matrix error $Err_p$, the RMSE re-projection error can more effectively evaluate the accuracy of image registration. A smaller average inlier error indicates that the association between the inliers in two images is relatively accurate, which can indirectly be used to evaluate the transformation matrix accuracy. The formula for calculating the RMSE re-projection error is shown below, where (p, p') represents true matching point pairs provided by the dataset, k is the number of true matching point pairs, and f is the transformation model solved through the algorithm.

$$Err_{RMSE} = \sqrt{\frac{\sum_{i=1}^{k} \|f(p, \theta) - p'\|^s}{k}}$$

Figure 5:
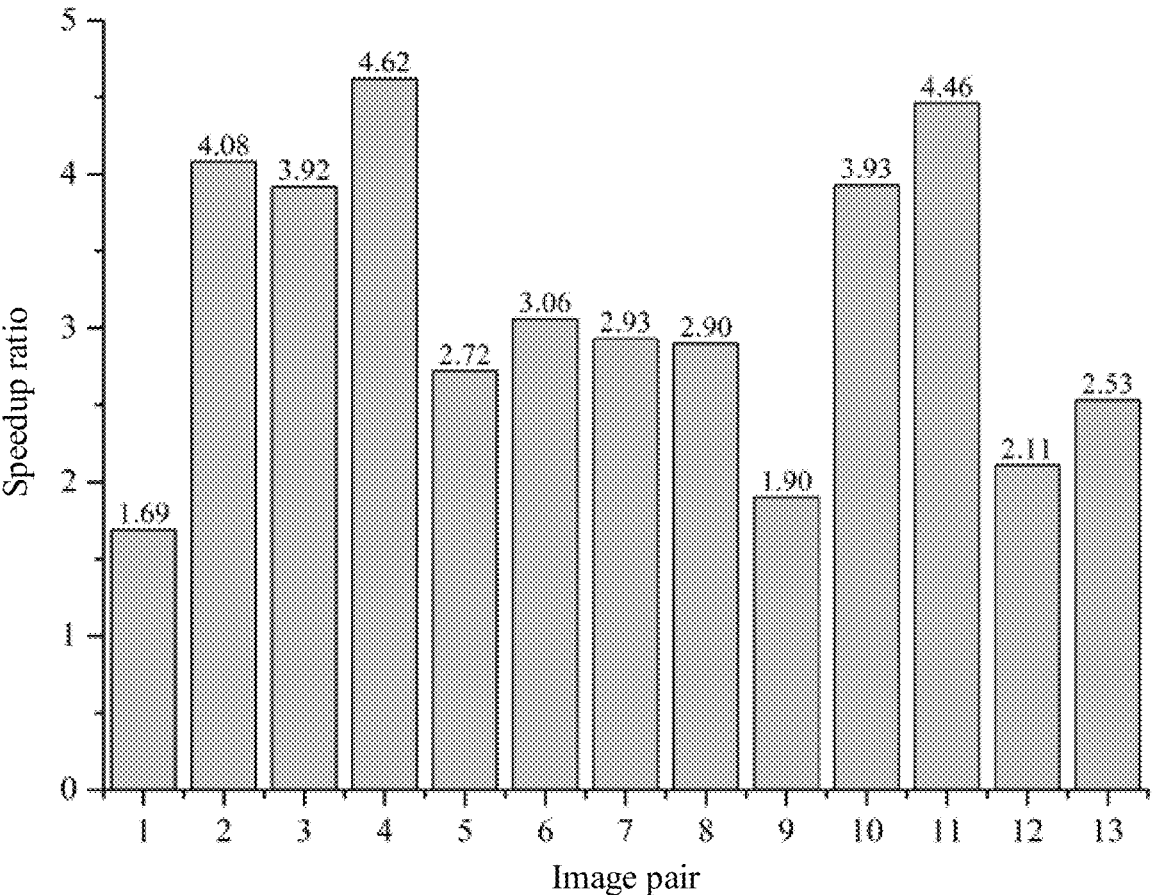
FIG. 5 is a diagram illustrating the speedup ratios for different image pairs.

Table 1 shows the experimental results of two methods on inlier search performance, where the numerical values highlighted in gray with black text represent the best values. In general, the inlier search performance of the FDESAC algorithm is not as good as that of the DESAC algorithm, but the difference is very small. Moreover, in image pairs (11) and (13), the average inlier count of the FDESAC algorithm even exceeds that of the DESAC algorithm. In terms of the maximum inlier count, the FDESAC algorithm is consistent with the DESAC algorithm. However, The FDESAC algorithm has excellent time performance. FIG. 5 shows the speedup ratios for different image pairs, which are each defined as the ratio of the running time of the DESAC algorithm to that of the FDESAC algorithm. It can be seen the speedup ratios for most images exceed 2.5, with the highest and lowest speedup ratios being 4.62 and 1.69, respectively, and the average speedup ratio reaching 3.14. As shown in Table 1, this is because the three strategies of the FDESAC algorithm can effectively reduce the number of hypothesis models, the number of verifications for a single hypothesis model, and the number of iterations.

Moreover, Table 2 shows the experimental results of two algorithms on perspective matrix accuracy. In terms of the RMSE re-projection error and the average inlier error, the two algorithms show similar average values across all images, with the FDESAC algorithm being slightly lower. The FDESAC algorithm outperforms the DESAC algorithm in terms of the number of image pairs, with 8 and 11 pairs respectively. Therefore, FDESAC can effectively reduce running time while maintaining or even slightly improving the perspective matrix accuracy.

TABLE 1

Experimental Results of DESAC and FDESAC Algorithms on Inlier Search
Performance

| Image pair | Algorithm | Average inlier count (average inlier ratio) | Maximum inlier count (maximum inlier ratio) | Number of hypothesis models | Number of models verifications for each individual | Number of iterations | Running time (s) |
|---|---|---|---|---|---|---|---|
| (1) ISI = 564 | DESAC | 365.97 (64.89%) | 367 (65.07%) | 32809.24 | 71.88 | 313.02 | 4.33 |
| | FDESAC | 365.93 (64.88%) | 367 (65.07%) | 16064.67 | 92.57 | 174.95 | 2.56 |
| (2) ISI = 3013 | DESAC | 555.99 (18.45%) | 557 (18.49%) | 41957.30 | 210.54 | 380.11 | 16.23 |
| | FDESAC | 555.90 (18.45%) | 557 (18.49%) | 20430.81 | 117.11 | 204.36 | 3.97 |
| (3) ISI = 4707 | DESAC | 1107.49 (23.53%) | 1112 (23.62%) | 67880.46 | 279.76 | 598.06 | 33.41 |
| | FDESAC | 1106.86 (23.52%) | 1112 (23.62%) | 34964.71 | 152.13 | 328.34 | 8.52 |
| (4) ISI = 3700 | DESAC | 506.09 (13.68%) | 507 (13.70%) | 31767.43 | 248.59 | 294.02 | 14.49 |
| | FDESAC | 505.68 (13.67%) | 507 (13.70%) | 21433.02 | 88.61 | 208.54 | 3.14 |
| (5) ISI = 1543 | DESAC | 225.48 (14.61%) | 227 (14.71%) | 12368.54 | 514.21 | 169.71 | 11.21 |
| | FDESAC | 225.44 (14.61%) | 227 (14.71%) | 11203.77 | 232.88 | 157.03 | 4.12 |
| (6) ISI = 1640 | DESAC | 300.59 (18.33%) | 303 (18.48%) | 16141.55 | 291.90 | 190.27 | 7.84 |
| | FDESAC | 300.58 (18.33%) | 303 (18.48%) | 10770.94 | 148.96 | 139.93 | 2.56 |
| (7) ISI = 8615 | DESAC | 3152.13 (36.59%) | 3156 (36.63%) | 39008.46 | 1012.15 | 407.36 | 70.36 |
| | FDESAC | 3151.44 (36.58%) | 3156 (36.63%) | 25966.64 | 522.83 | 293.65 | 23.99 |
| (8) ISI = 9289 | DESAC | 175.79 (1.89%) | 192 (2.07%) | 211787.34 | 283.24 | 1826.35 | 108.48 |
| | FDESAC | 174.91 (1.88%) | 192 (2.07%) | 315550.20 | 65.23 | 2689.81 | 37.41 |
| (9) ISI = 348 | DESAC | 148 (42.53%) | 148 (42.53%) | 4447.90 | 78.14 | 52.75 | 0.75 |
| | FDESAC | 148 (42.53%) | 148 (42.53%) | 4130.17 | 58.00 | 46.90 | 0.40 |
| (10) ISI = 3592 | DESAC | 614.36 (17.10%) | 617 (17.18%) | 21531.53 | 441.98 | 226.29 | 17.31 |
| | FDESAC | 614.05 (17.09%) | 617 (17.18%) | 11355.96 | 244.94 | 136.41 | 4.40 |
| (11) ISI = 3338 | DESAC | 163.54 (4.90%) | 164 (4.91%) | 8735.15 | 426.30 | 99.04 | 7.57 |
| | FDESAC | 163.55 (4.90%) | 164 (4.91%) | 7654.01 | 139.16 | 86.53 | 1.70 |

TABLE 1-continued

Experimental Results of DESAC and FDESAC Algorithms on Inlier Search
Performance

| Image pair | Algorithm | Average inlier count (average inlier ratio) | Maximum inlier count (maximum inlier ratio) | Number of hypothesis models | Number of models verifications for each individual | Number of iterations | Running time (s) |
|---|---|---|---|---|---|---|---|
| (12) | DESAC | 776.54 (48.41%) | 778 (48.50%) | 19768.49 | 255.89 | 221.79 | 8.61 |
| \|S\| = 1604 | FDESAC | 776.47 (48.41%) | 778 (48.50%) | 11979.35 | 222.02 | 152.50 | 4.07 |
| (13) | DESAC | 315.93 (23.56%) | 316 (23.56%) | 6042.14 | 288.09 | 76.99 | 3.01 |
| \|S\| = 1341 | FDESAC | 315.98 (23.56%) | 316 (23.56%) | 5345.14 | 145.11 | 67.12 | 1.19 |

TABLE 2

Experimental Results of DESAC and FDESAC Algorithms on
Perspective Matrix Accuracy

| Image | Algorithm | $Err_{RMSE}$ | $Err_i$ |
|---|---|---|---|
| (1) | DESAC | 1.896999 | 1.632220 |
| \|S\| = 564 | FDESAC | 1.861100 | 1.629616 |
| (2) | DESAC | 1.866328 | 1.311108 |
| \|S\| = 3013 | FDESAC | 1.846498 | 1.289758 |
| (3) | DESAC | 1.597292 | 1.659663 |
| \|S\| = 4707 | FDESAC | 1.544056 | 1.588967 |
| (4) | DESAC | 2.245058 | 1.408356 |
| \|S\| = 3700 | FDESAC | 2.176331 | 1.364143 |
| (5) | DESAC | 4.978024 | 2.328443 |
| \|S\| = 1543 | FDESAC | 5.018536 | 2.332412 |
| (6) | DESAC | 2.063119 | 2.246596 |
| \|S\| = 1640 | FDESAC | 2.064336 | 2.248776 |
| (7) | DESAC | 1.476891 | 2.125879 |
| \|S\| = 8615 | FDESAC | 1.449070 | 2.113851 |
| (8) | DESAC | 4.157366 | 2.860139 |
| \|S\| = 9289 | FDESAC | 4.365841 | 2.856509 |
| (9) | DESAC | 1.468714 | 1.496127 |
| \|S\| = 348 | FDESAC | 1.447599 | 1.478517 |
| (10) | DESAC | 1.980447 | 1.391643 |
| \|S\| = 3592 | FDESAC | 2.016966 | 1.349167 |
| (11) | DESAC | 1.560671 | 1.734453 |
| \|S\| = 3338 | FDESAC | 1.530820 | 1.712044 |
| (12) | DESAC | 1.888487 | 1.996138 |
| \|S\| = 1604 | FDESAC | 1.895550 | 1.993691 |
| (13) | DESAC | 1.609282 | 1.444934 |
| \|S\| = 1341 | FDESAC | 1.554803 | 1.438614 |
| Average | DESAC | 2.214514 | 1.818131 |
| value | FDESAC | 2.213193 | 1.799697 |

Next, three experiments are designed focusing on inlier search performance, transformation matrix accuracy, and iteration performance, with the aim of demonstrating the overall performance of the FDESAC algorithm and verifying the superiority of the proposed method.

Inlier search performance: the FDESAC algorithm will undergo a comprehensive performance comparison with advanced RANSAC variants. First, all methods will be run with an equal total number of verifications, comparing the total average inlier counts and total maximum inlier counts thereof across all image pairs. The iteration stopping condition for all the algorithms is set to a consistent total number of verifications, and the algorithms terminate when the total number of verifications of other algorithms matches that of the FDESAC algorithm.

Figure 6:
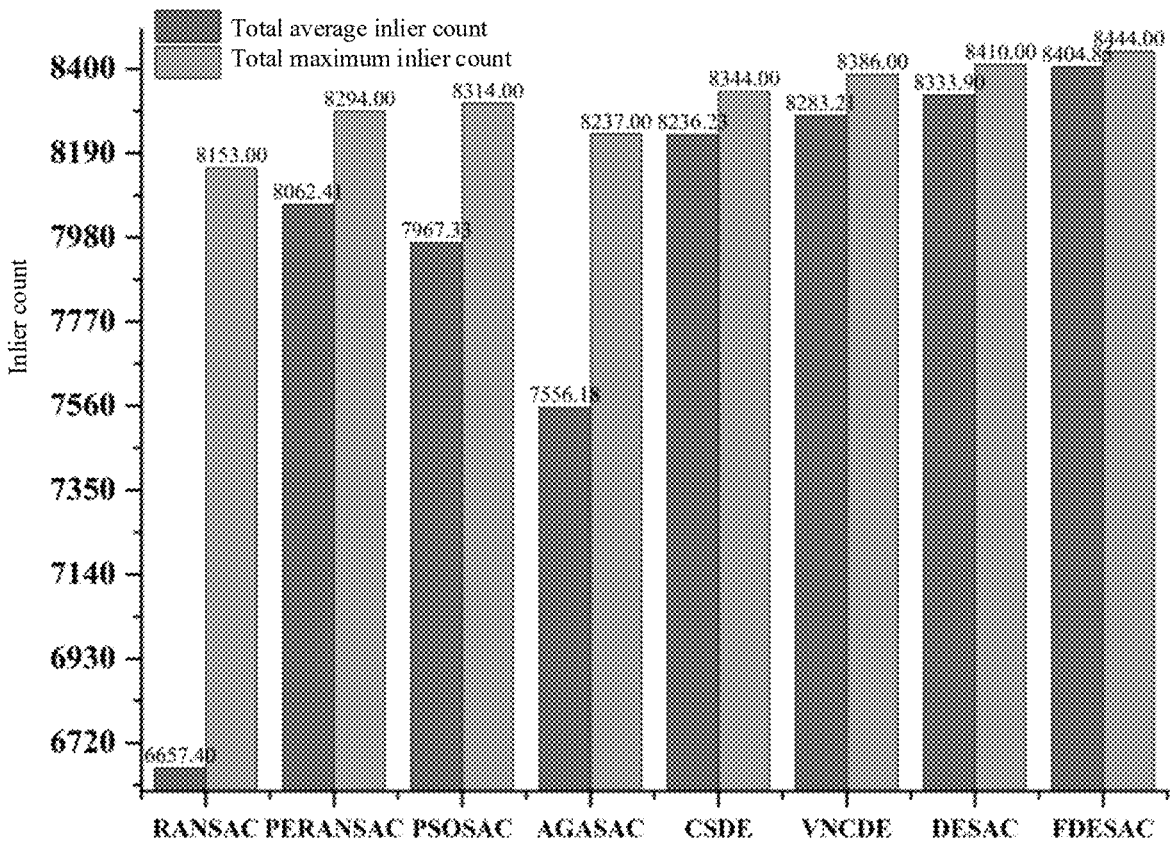
FIG. 6 is a diagram illustrating a comparison of the total average inlier count and the total maximum inlier count across different algorithms.

FIG. 6 shows the total average inlier counts and the total maximum inlier counts for different algorithms across all image pairs. It can be seen that the FDESAC algorithm achieves the highest values in both the total average inlier count and the total maximum inlier count, indicating that said algorithm possesses the strongest inlier search capability under a relatively small number of verifications. In contrast, the baseline RANSAC algorithm has the lowest values in the both indexes, with a significant difference therebetween, and the difference between said algorithm and other algorithms in terms of the maximum inlier count is smaller than the difference in the average inlier count. The CSDE, VNCDE, DESAC, and FDESAC algorithms show nearly consistent trends across the both indexes. The PSOSAC algorithm is inferior to the PERANSAC algorithm in terms of the average inlier count, but is superior to the PERANSAC algorithm in terms of the maximum inlier count. This indirectly demonstrates that RANSAC based on parameter space optimization has a distinct advantage in searching for the maximum value of the inlier count.

Figure 7:
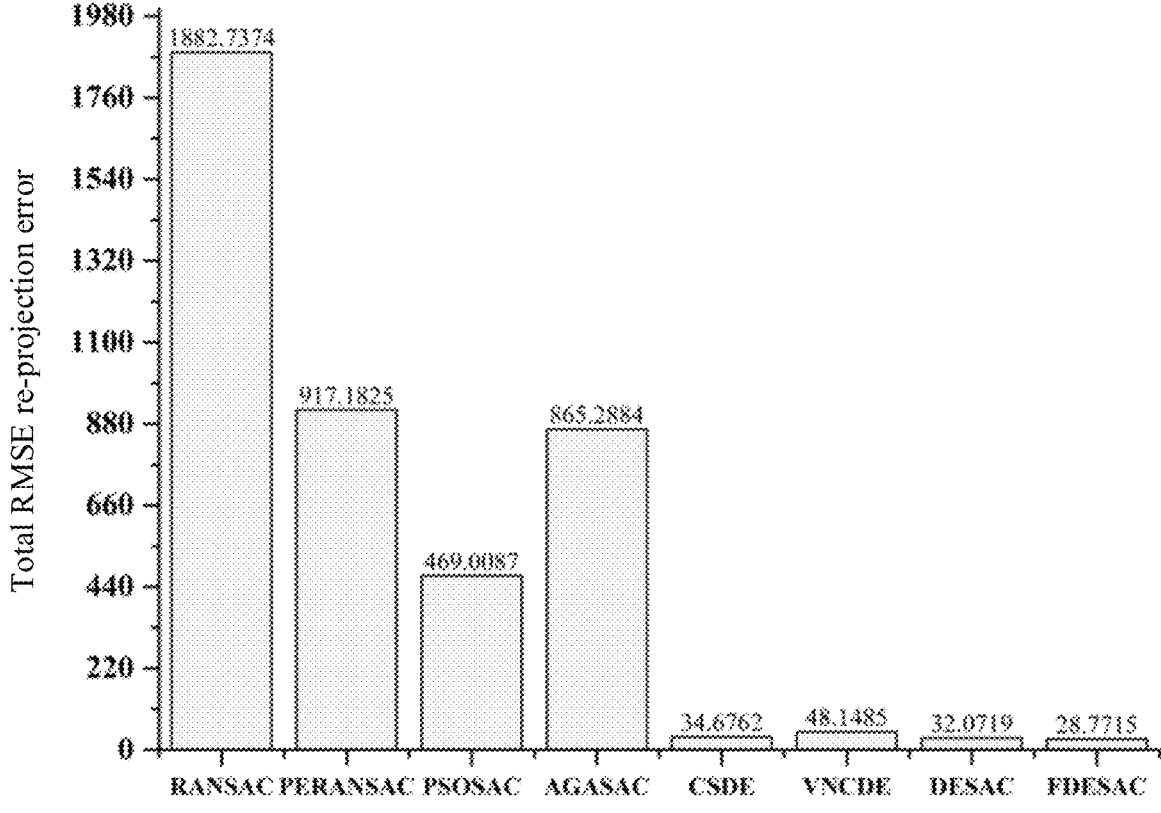
FIG. 7 is a diagram illustrating a comparison of the total RMSE re-projection errors.
Figure 8:
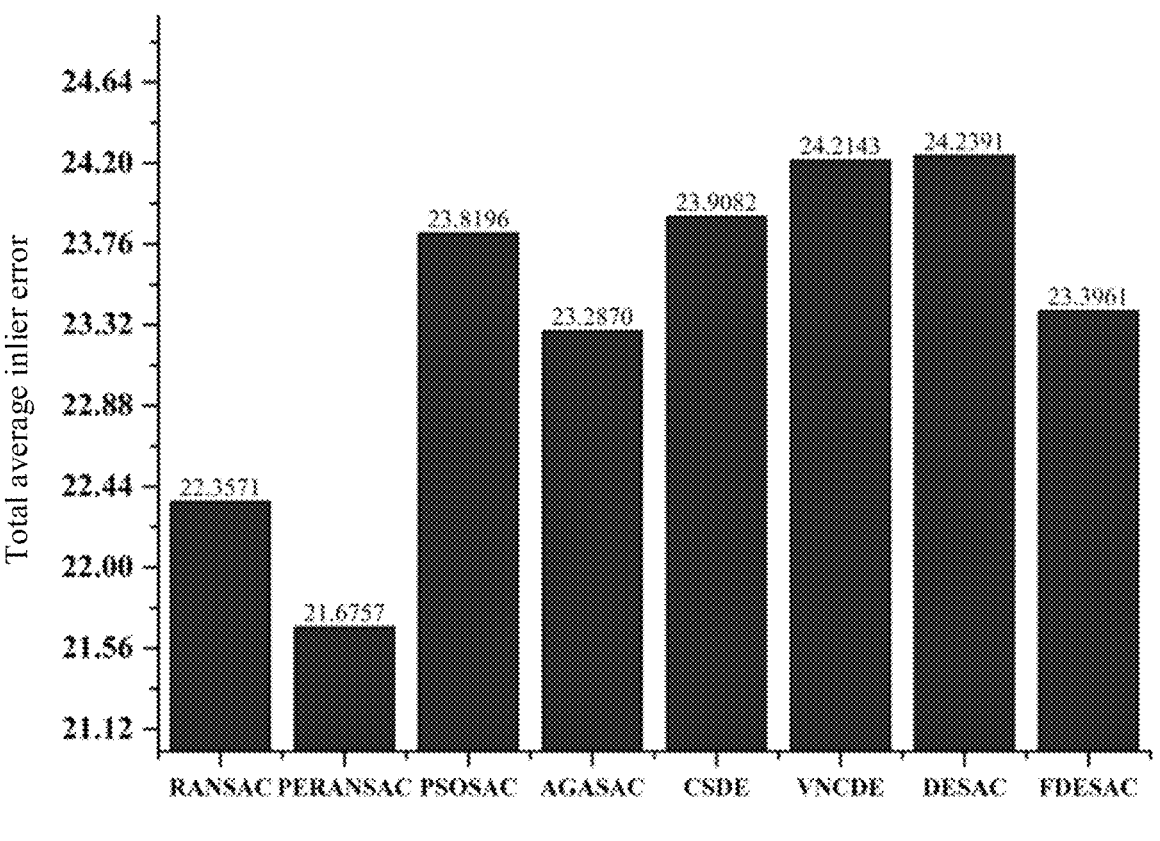
FIG. 8 is a diagram illustrating a comparison of the total average inlier errors.

Transformation matrix accuracy: the FDESAC algorithm is compared with other algorithms in terms of the transformation matrix accuracy. All methods are still run with an equal total number of verifications, and the total RMSE re-projection error and the total average inlier error are compared across all images. FIGS. 7 and 8 show the total RMSE re-projection error and the total average inlier error for different algorithms across all image pairs, respectively. In terms of the total RMSE re-projection error, the FDESAC algorithm yields the smallest value among all algorithms, lower than the DESAC algorithm. Four RANSAC algorithms improved based on differential evolution algorithms perform well. This is attributed to the ability thereof to return consensus sets with a larger inlier count, as a consensus set with a larger inlier count has greater reliability. However, because the remaining algorithms perform poorly on image pairs (8) and (11), a smaller inlier count results in an unreliable transformation model corresponding to the consensus set, leading to higher RMSE re-projection errors. In terms of the overall average inlier error, the FDESAC algorithm performs better than the PSOSAC, CSDE, VNCDE, and DESAC algorithms, but worse than the RANSAC, PERANSAC, and AGASAC algorithms. This is because these three algorithms return only a small inlier count in most runs, and the errors of these inliers are relatively small, while the transformation models corresponding to a small inlier count are often inaccurate. FDESAC can find as many inliers as possible while controlling the average inlier error at a low level.

Figure 9A:
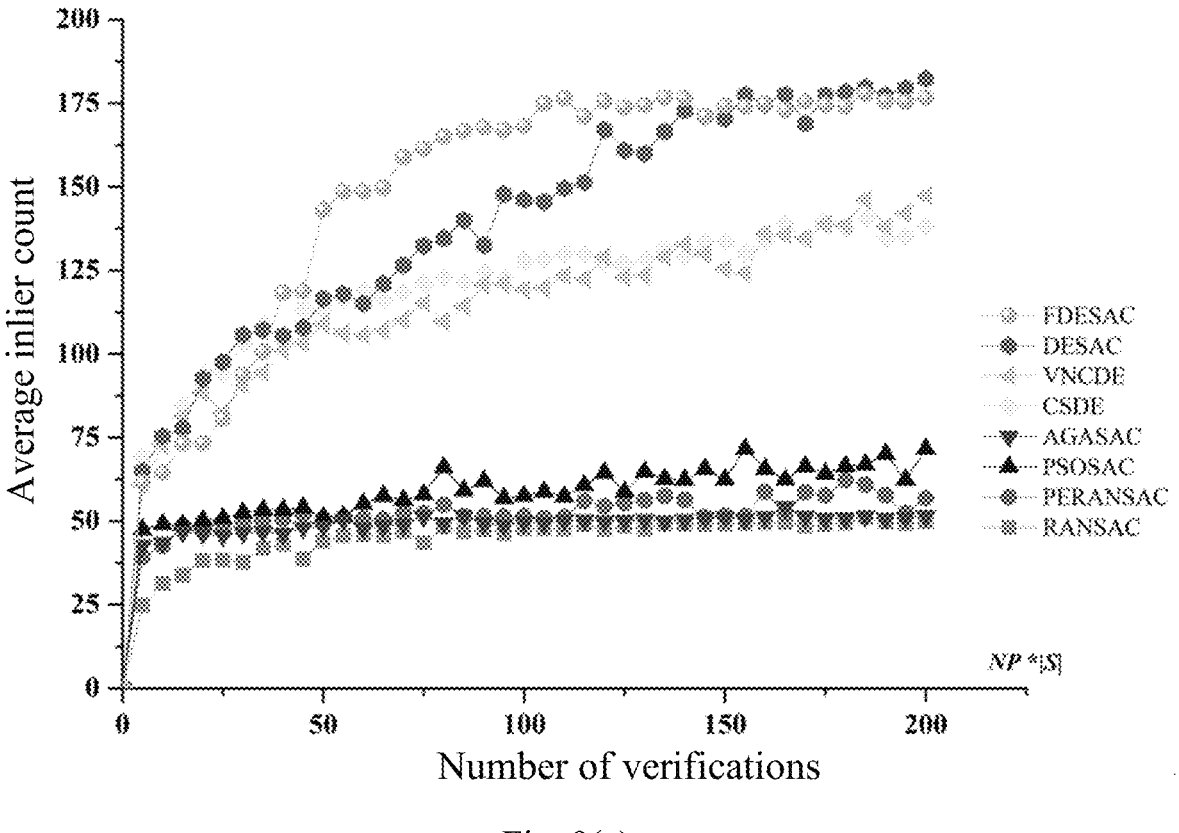
FIGS. 9(a) and 9(b) is a broken line graph illustrating the variations in the average inlier count and the maximum inlier count along with the number of verifications.
Figure 9B:
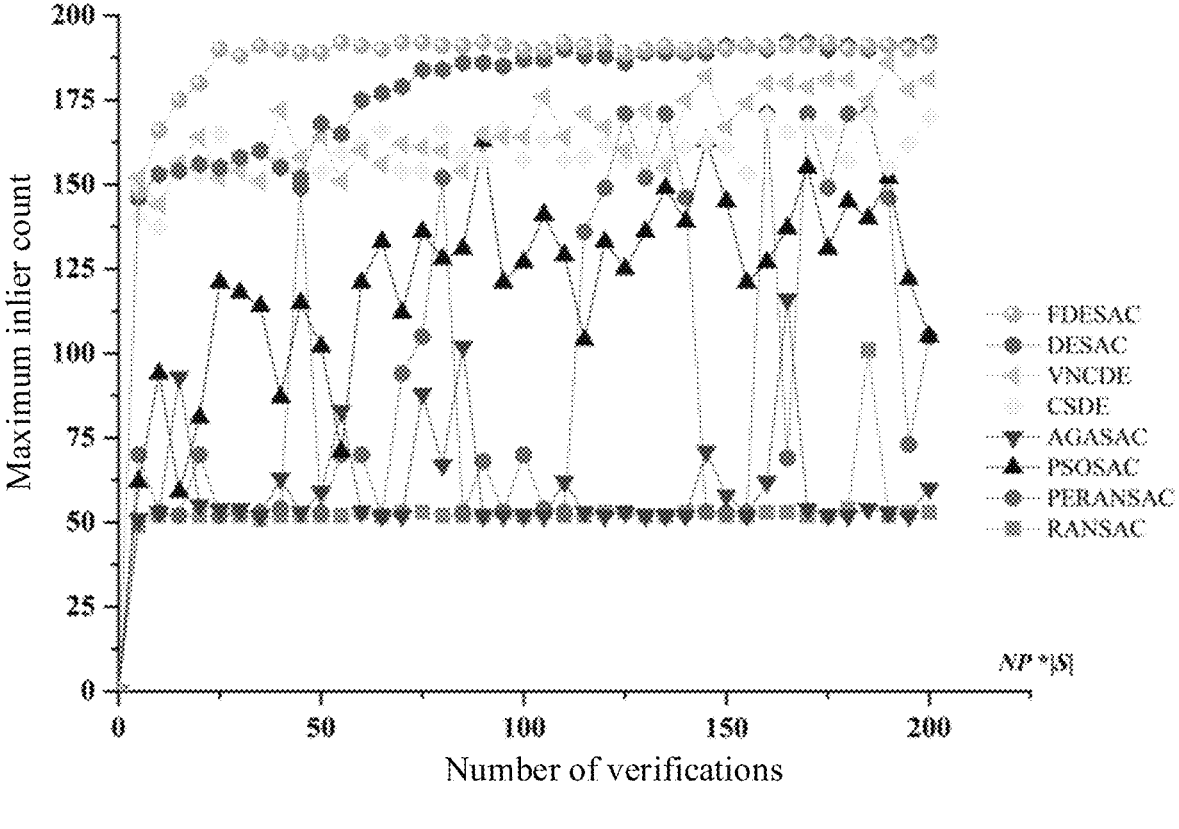

Iteration performance: to observe the variation trend of inlier counts as the number of verifications increases for different algorithms, an iteration performance experiment is conducted with the iteration stopping condition set to a fixed number of verifications. Observing the variations in the inlier counts can intuitively reflect the running efficiency of the algorithms. FIGS. 9(a) and 9(b) shows the variations in the average inlier counts and the maximum inlier counts for different algorithms in the case that the total number of verifications is 5*NP*|S| to 200*NP*|S| (with an interval of 5*NP*|S|). Experiments are conducted on the image pair (8) with an extremely low inlier ratio (~2%) and a very large total number of samples (9289).

In terms of the average inlier count, the FDESAC algorithm grows slower than the DESAC algorithm within 40*NP*|S|, but performs better than the DESAC algorithm at 40*NP *|S| to 150*NP*|S|. At 150*NP*|S| to 200*NP*|S|, both the FDESAC algorithm and the DESAC algorithm tend to converge to similar average inlier counts. The curves of the CSDE and VNCDE algorithms are similar. In the early and middle stages, the CSDE algorithm performs slightly better than the VNCDE algorithm, while in the later stages, the VNCDE algorithm performs better than the CSDE algorithm. The remaining algorithms perform poorly, with the baseline RANSAC algorithm performing the worst, quickly converging to an extremely low value.

In terms of the maximum inlier count, the FDESAC algorithm consistently outperforms the DESAC algorithm, and requires only 5*NP*|S| to 25*NP*|S| to converge to the maximum inlier count. In contrast, the DESAC algorithm requires a range of 5*NP*|S| to 110*NP*|S| to achieve the same result. The VNCDE algorithm performs better than the CSDE algorithm in searching for the maximum inlier count. Despite occasionally finding a high maximum inlier count, the remaining algorithms are extremely unstable. The baseline RANSAC algorithm still performs the worst in terms of searching for the maximum inlier count. Therefore, the FDESAC algorithm has excellent time performance, so that said algorithm can find a higher number of inliers with relatively few verifications and return a more reliable consensus set and transformation model.

To study the improvements brought about by each modification to the FDESAC algorithm, experimental results are presented for the FDESAC algorithm with each improvement removed. Then, the influence of different scaling factors F on the FDESAC algorithm is analyzed. Table 3 shows the experimental results of the FDESAC algorithm with each improvement removed, where the iteration stopping condition is that the population inlier count in the algorithm remains consistent. Algorithms Remove1, Remove2, and Remove3 represent the FDESAC algorithm with the fast test removed, the improved resident initialization removed, and/set to a fixed value of 0.75, respectively. The values highlighted in gray with black text are the optimal values.

In general, algorithm Remove3, due to its higher scaling factor F, exhibits the best overall performance in terms of the average inlier count and the maximum inlier count. With three improvements applied, the FDESAC algorithm demonstrates the best time performance across the vast majority of image pairs. A fast test is the improvement that yields the biggest increase in speed. After removing the fast test, the number of hypothesis models and the number of iterations in algorithm Remove1 do not did not change significantly, but the number of verifications for each model increases dramatically, which directly led to an increase in the running time of the algorithm. For algorithm Remove2, which removes the improved resident initialization, the quality of the generated models deteriorates, leading to an increase in the number of hypothesis models generated and the number of iterations required, while the number of verifications for model decreases accordingly. Therefore, algorithm Remove2 has the lowest average inlier count among the four methods. Although the running time thereof is similar to that of the FDESAC algorithm, said algorithm is still not as good as the FDESAC algorithm. For algorithm Remove3, a higher/value directly improves the accuracy of the algorithm, but it also increases the number of hypothesis models and the number of iterations, resulting in an increase in the running time of the algorithm.

TABLE 3

Experimental Results after Removing Various Improvements

| Image pair | Algorithm | Average inlier count (average inlier ratio) | Maximum inlier count (maximum inlier ratio) | Number of hypotheses is models | Number of verifica- tions for each individual | Number of iterations | Running time (s) |
|---|---|---|---|---|---|---|---|
| (1) | Remove 1 | 366.06(64.90%) | 367(65.07%) | 16009.02 | 124.27 | 174.35 | 3.12 |
| \|S\| = 564 | Remove 2 | 365.69(64.84%) | 367(65.07%) | 24249.50 | 57.12 | 242.39 | 2.76 |
| | Remove 3 | 366.21(64.93%) | 368(65.25%) | 23433.68 | 85.59 | 235.37 | 3.23 |
| | FDESAC | 365.93(64.88%) | 367(65.07%) | 16064.67 | 92.57 | 174.95 | 2.56 |
| (2) | Remove 1 | 555.92(18.45%) | 557(18.49%) | 20938.43 | 396.97 | 208.48 | 13.06 |
| \|S\| = 3013 | Remove 2 | 555.84(18.45%) | 557(18.49%) | 35373.66 | 65.71 | 325.84 | 4.69 |
| | Remove 3 | 556.04(18.45%) | 557(18.49%) | 30085.00 | 103.47 | 283.40 | 5.04 |
| | FDESAC | 555.90(18.45%) | 557(18.49%) | 20430.81 | 117.11 | 204.36 | 3.97 |

TABLE 3-continued

Experimental Results after Removing Various Improvements

| Image pair | Algorithm | Average inlier count (average inlier ratio) | Maximum inlier count (maximum inlier ratio) | Number of hypotheses is models | Number of verifica-tions for each individual | Number of iterations | Running time (s) |
|---|---|---|---|---|---|---|---|
| (3) \|S\| = 4707 | Remove 1 | 1107.20(23.52%) | 1112(23.62%) | 35281.44 | 482.65 | 332.59 | 27.97 |
| | Remove 2 | 1106.48(23.51%) | 1110(23.60%) | 51055.44 | 96.24 | 458.02 | 9.15 |
| | Remove 3 | 1107.56(23.53%) | 1112(23.62%) | 39660.26 | 178.78 | 368.37 | 11.60 |
| | FDESAC | 1106.92(23.52%) | 1112(23.62%) | 34964.71 | 152.13 | 328.34 | 8.52 |
| (4) \|S\| = 3700 | Remove 1 | 505.80(13.67%) | 507(13.70%) | 17922.23 | 410.33 | 182.00 | 11.70 |
| | Remove 2 | 505.35(13.66%) | 507(13.70%) | 25640.38 | 69.71 | 241.88 | 4.28 |
| | Remove 3 | 506.05(13.68% | 508(13.73%) | 22162.07 | 104.22 | 217.60 | 4.09 |
| | FDESAC | 505.68(13.67%) | 507(13.70%) | 21433.02 | 88.61 | 208.54 | 3.14 |
| (5) \|S\| = 1543 | Remove 1 | 225.66(14.62%) | 227(14.71%) | 11437.06 | 529.22 | 158.80 | 9.04 |
| | Remove 2 | 225.21(14.60%) | 227(14.71%) | 11785.44 | 239.18 | 165.32 | 4.84 |
| | Remove 3 | 225.67(14.63% | 227(14.71%) | 12214.60 | 228.45 | 164.74 | 4.42 |
| | FDESAC | 225.44(14.61%) | 227(14.71%) | 11203.77 | 232.88 | 157.03 | 4.12 |
| (6) \|S\| = 1640 | Remove 1 | 300.58(18.33%) | 305(18.60%) | 12138.66 | 411.95 | 150.51 | 7.54 |
| | Remove 2 | 300.38(18.32%) | 302(18.41%) | 12842.18 | 104.67 | 159.61 | 2.49 |
| | Remove 3 | 300.70(18.34%) | 302(18.41%) | 11695.49 | 147.59 | 148.63 | 2.88 |
| | FDESAC | 300.58(18.33%) | 303(18.48%) | 10770.94 | 148.96 | 139.93 | 2.56 |
| (7) \|S\| = 8615 | Remove 1 | 3151.41(36.58%) | 3156(36.63%) | 24897.36 | 1288.57 | 284.47 | 52.46 |
| | Remove 2 | 3150.84(36.57%) | 3156(36.63%) | 29247.89 | 436.36 | 321.92 | 23.21 |
| | Remove 3 | 3153.18(36.60%) | 3156(36.63%) | 31145.37 | 543.98 | 340.93 | 27.42 |
| | FDESAC | 3151.44(36.58%) | 3156(36.63%) | 25966.64 | 522.83 | 293.65 | 23.99 |
| | Remove 1 | 176.98(1.91%) | 191(2.06%) | 202095.30 | 277.84 | 1747.72 | 92.22 |
| | Remove 2 | 173.93(1.88%) | 191(2.06%) | 295855.60 | 70.92 | 2522.26 | 40.94 |
| (8) \|S\| = 9289 | Remove 3 | 175.19(1.89%) | 192(2.07%) | 350371.03 | 68.40 | 2981.21 | 42.12 |
| | FDESAC | 174.91(1.88%) | 192(2.07%) | 315550.20 | 65.23 | 2689.81 | 37.41 |
| (9) \|S\| = 348 | Remove 1 | 148.00(42.53%) | 148(42.53%) | 4278.14 | 99.91 | 49.01 | 0.66 |
| | Remove 2 | 147.94(42.51%) | 148(42.53%) | 4822.57 | 50.10 | 58.49 | 0.42 |
| | Remove 3 | 147.97(42.52%) | 148(42.53%) | 4142.59 | 56.15 | 46.64 | 0.39 |
| | FDESAC | 148.00(42.53%) | 148(42.53%) | 4130.17 | 58.01 | 46.90 | 0.40 |
| (10) \|S\| = 3592 | Remove 1 | 614.17(17.10%) | 617(17.18%) | 12877.53 | 731.98 | 149.21 | 13.99 |
| | Remove 2 | 614.04(17.09%) | 617(17.18%) | 17338.99 | 141.47 | 189.38 | 5.03 |
| | Remove 3 | 614.47(17.11%) | 617(17.18%) | 15043.75 | 226.23 | 170.89 | 5.33 |
| | FDESAC | 614.05(17.09%) | 617(17.18%) | 11355.96 | 244.94 | 136.41 | 4.40 |
| (11) \|S\| = 3338 | Remove 1 | 163.65(4.90%) | 164(4.91%) | 7591.20 | 463.80 | 86.50 | 5.24 |
| | Remove 2 | 163.46(4.90%) | 164(4.91%) | 8242.66 | 142.25 | 93.71 | 2.19 |
| | Remove 3 | 163.64(4.90%) | 164(4.91%) | 7815.68 | 137.49 | 87.91 | 1.70 |
| | FDESAC | 163.55(4.90%) | 164(4.91%) | 7654.01 | 139.16 | 86.53 | 1.70 |
| (12) \|S\| = 1604 | Remove 1 | 776.36(48.40%) | 778(48.50%) | 12093.00 | 390.97 | 152.90 | 7.00 |
| | Remove 2 | 776.24(48.39%) | 778(48.50%) | 14604.97 | 160.22 | 176.89 | 5.06 |
| | Remove 3 | 776.51(48.41%) | 778(48.50%) | 14695.59 | 217.23 | 176.34 | 4.91 |
| | FDESAC | 776.47(48.41%) | 778(48.50%) | 11979.35 | 222.02 | 152.50 | 4.07 |

TABLE 3-continued

| | | Experimental Results after Removing Various Improvements | | | | | |
|---|---|---|---|---|---|---|---|
| Image pair | Algorithm | Average inlier count (average inlier ratio) | Maximum inlier count (maximum inlier ratio) | Number of hypothes is models | Number of verifica- tions for each individual | Number of iterations | Running time (s) |
| (13) \|S\| = 1341 | Remove 1 | 315.98(23.56%) | 316(23.56%) | 5481.97 | 382.19 | 68.19 | 3.23 |
| | Remove 2 | 315.94(23.56%) | 316(23.56%) | 6045.54 | 111.78 | 78.06 | 1.22 |
| | Remove 3 | 315.96(23.56%) | 316(23.56%) | 5355.40 | 147.01 | 66.76 | 1.23 |
| | FDESAC | 315.98(23.56%) | 316(23.56%) | 5345.14 | 145.11 | 67.12 | 1.19 |

Figure 10:
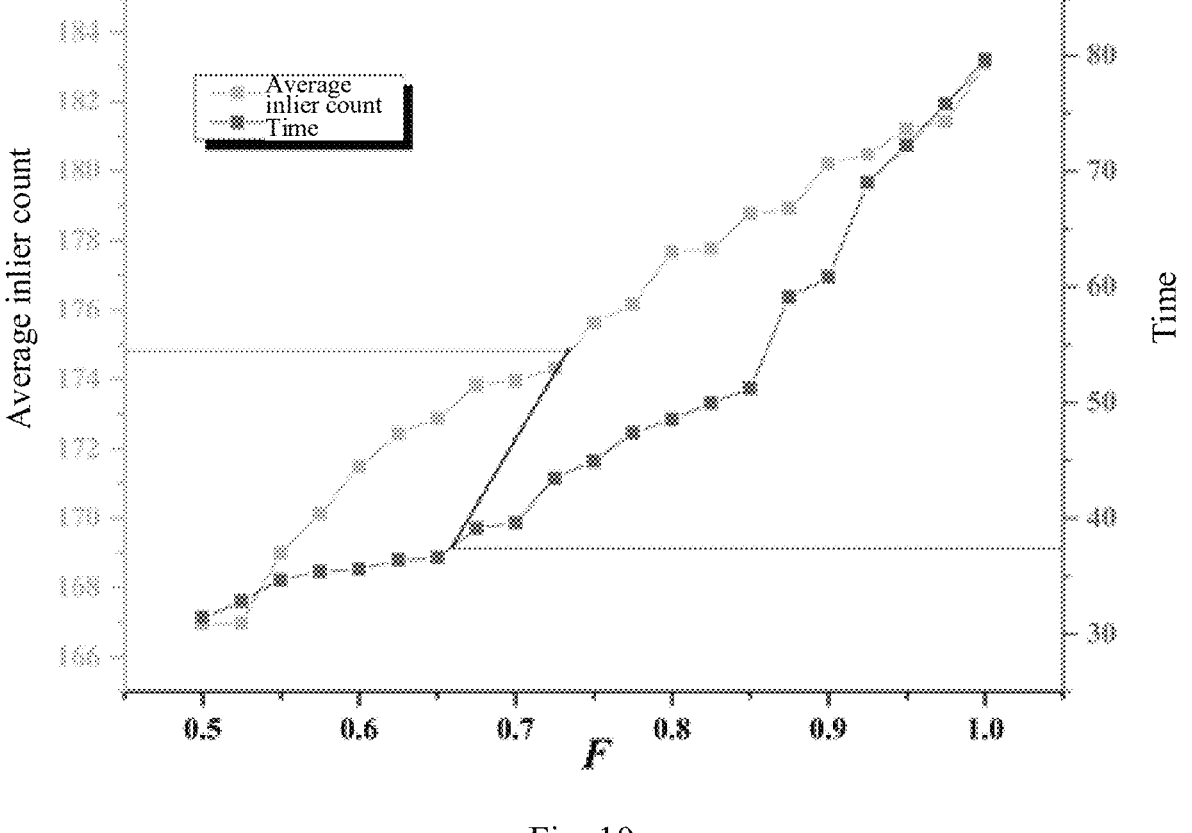
FIG. 10 is a curve graph illustrating the influences of different F values on FDESAC.

To more directly illustrate the accuracy and speed comparison of the FDESAC algorithm applying different F values and adaptive F strategies, FIG. 10 is a broken line graph illustrating the average inlier count and the running time of the FDESAC algorithm with different F values on image pair (8). The green horizontal line represents the average inlier count of the FDESAC algorithm applying the adaptive F strategy, and the blue horizontal line represents the running time thereof. Here, a black line is used to connect the two points corresponding to the two values of the FDESAC algorithm applying the adaptive F strategy. A smaller slope of the black line indicates that the strategy can find a higher number of inliers within less time, demonstrating that the algorithm is more efficient than simply adjusting the F value. It can be seen that the average inlier count and the running time increase correspondingly with the increase of F. Moreover, the black line is not vertical, but slopes from the bottom left to the top right. Therefore, the FDESAC algorithm using the adaptive F strategy is more effective than simply adjusting the F value. In general, the three improvements proposed herein are all effective, and together enhance the running efficiency of the DESAC algorithm.

The above descriptions are merely preferred embodiments of the present invention, and are not intended to limit the present invention. A person skilled in the art can make various modifications and variations on the present invention. Any modifications, equivalent substitutions, improvements, etc. made within the spirit and principle of the present invention should be included within the scopes of protection of the present invention.

What is claimed is:

1. An image registration method using a Fast Differential Evolution Sample Consensus (FDESAC) algorithm based on historical records, comprising the following steps:

step 1: image acquisition: acquiring, by an image acquisition module, a to-be-registered image $I_1$ (x, y) and a reference image $I_2$ (x', y'), and transmitting the two images to a feature extraction module;

step 2: feature extraction: respectively extracting, by the feature extraction module, point features of the to-be-registered image $I_1$ (x, y) and the reference image $I_2$ (x', y') by using a SIFT algorithm, to obtain a to-be-registered point feature set $F_1$ and a reference point feature set $F_2$, and transmitting the two point feature sets to a feature matching module;

step 3: feature matching: performing, by the feature matching module, coarse feature matching between the to-be-registered point feature set $F_1$ and the reference point feature set $F_2$ to obtain a matching point pair set, namely, a sample set S, and transmitting the sample set S to an image registration module using the FDESAC algorithm based on historical records;

step 4: parameter setting, setting, by the image registration module, the following parameters according to the sample set S: a SIFT feature distance ratio $D_r$, an inlier determination error threshold t, a population size NP, a weighting factor average value μw, and a pretest sample count $N_f$, and setting a neighborhood range Nr=NP/10 and an initial inlier count $n_f$=$N_f$;

step 5: sorting, by the image registration module, the sample set S in ascending order according to the SIFT feature distance ratio $D_r$, then calculating BP according to the sample set S, and initializing a sample inlier archive $A_S$ and a model inlier archive $A_M$; and calculating a fast test execution threshold uT according to the pretest sample count $N_f$ and the initial inlier count $n_f$;

step 6: first-time initialization of a population: randomly selecting m samples from a top BP*\|S\| range of the sample set S to initialize an individual $X_i$, testing the individual $X_i$, i∈[0, NP] through a test function Test, to obtain an evaluation index $EI_i$ of the individual $X_i$, and updating the model inlier archive $A_M$;

step 7: updating the fast test execution threshold uT according to the pretest sample count $N_f$ and an inlier count Inlier(X);

step 8: mutation phase: initializing a weight coefficient set $S_w$ of a mutated individual that successfully proceeds to the next iteration, calculating a scaling factor $F_i$ according to the weight coefficient set $S_w$, and calculating the mutated individual $V_i$ according to the scaling factor $F_i$;

step 9: selection phase: testing the mutated individuals $V_i$ through the test function Test, to obtain an evaluation index $EI_v$ of the mutated individual $V_i$; comparing the evaluation index $EI_i$ of the individual $X_i$ with the evaluation index $EI_v$ of the mutated individual $V_i$, and if the evaluation index $EI_v$ of the mutated individuals $V_i$ is superior to the evaluation index $EI_i$ of the individual $X_i$, replacing the individual $X_i$ with the mutated individual $V_i$, and recording a weighting factor w of the mutated individual $V_i$ into the weight coefficient set $S_w$;

otherwise, randomly selecting m samples from the top BP*\|S\| range of the sample set S to reinitialize the individual $X_i$, testing the individual $X_i$ through the test function Test, to obtain the evaluation index $EI_i$ of the individual $X_i$, and updating the model inlier archive $A_M$;

step 10: mutation operator parameter update: calculating the average value avg of the weight coefficient set $S_w$, and then calculating the weighting factor average value $\mu w$ according to the average value avg of the weight coefficient set $S_w$;

step 11: resident initialization of the population: calculating the number r of repetitions of resident initialization, if the number $|S_w|$ of successfully mutated individuals equals 0, setting r=3*NP; otherwise, setting r=3*NP/$|S_w|$;

searching for the worst individual $X_{worst}$ in the population;

if iter>N, and iter % ut=0, iter representing the number of iterations, within the top BP*|S| range of the sample set S, randomly selecting m samples with model inlier records satisfying $a_m \neq 0$ to reinitialize an individual $X_{new}$; otherwise, randomly selecting m samples within the top BP*|S| range of the sample set S to reinitialize the individual $X_{new}$;

testing the individual $X_{new}$ through the test function Test, to obtain an evaluation index $EI_{new}$ of the individual $X_{new}$, and updating the model inlier archive $A_M$; and comparing the evaluation index $EI_{new}$ of the individual $X_{new}$ with the evaluation index $EI_{worst}$ of the worst individual $X_{worst}$, and if the evaluation index $EI_{new}$ of the individual $X_{new}$ is superior to the evaluation index $EI_{worst}$ of the worst individual $X_{worst}$, replacing the worst individual $X_{worst}$ with the individual $X_{new}$;

step 12: repeating steps 7-11, and after reaching a preset number of iterations, proceeding to step 13; and step 13: selection of the best individual from the population: selecting the individual with the best evaluation indexes EI from the population and saving same as the best individual $X_{Best}$, and using the best individual $X_{Best}$ as a spatial geometric transformation model to perform spatial transformation on the to-be-registered image $I_1$ (x, y) to obtain a registered image.

2. The image registration method using an FDESAC algorithm based on historical records according to claim 1, wherein in step 2, the SIFT algorithm extracts point features across spaces of various scales, comprising but not limited to, corner points, edge points, bright spots in dark regions, and dark spots in bright regions.

3. The image registration method using an FDESAC algorithm based on historical records according to claim 1, wherein in step 5, the expression for BP calculated according to the sample set S is as follows:

$$BP = \begin{cases} 1 & , |S| \leq 100m \\ \dfrac{100m}{|S|} & , |S| > 100m \end{cases}$$

wherein m is the minimum number of samples required to generate a model, and |S| is the total number of samples; and the expression for calculating the fast test execution threshold uT is as follows:

$$uT = \left\lfloor 5 + 0.2 \cdot \left( \frac{n_f}{N_f} \cdot 100\% \right) \right\rfloor.$$

4. The image registration method using an FDESAC algorithm based on historical records according to claim 1, wherein in step 8, the expression for calculating the scaling factor $F_i$ is as follows:

$$F_i = \begin{cases} rand(0.6, 0.75) + 0.3 \times \dfrac{|S_w|}{NP} + 0.01, & \text{if } V_i^{g-1} \text{ mutation succeeds,} \\ rand(0.6, 0.75) + 0.3 \times \dfrac{|S_w|}{NP}, & \text{others.} \end{cases}$$

wherein rand(0.6, 0.75) is a uniformly distributed random number in an interval (0.6, 0.75), $|S_w|$ is the number of successfully mutated individuals from the previous generation of the population, NP is a population size, and g represents the g-th generation; and the expression for calculating the mutated individual $V_i$ is as follows:

$$V_i = wV_{rand1} + (1 - w)V_{local\_best}$$

$$\begin{cases} V_{rand1} = X_{r1} + F(X_{r2} - X_{r3}) \\ V_{local\_best} = X_{local\_best} + F(X_{r2} - X_{r3}) \end{cases}, (r1 \neq r2 \neq r3)$$

wherein the i-th mutated individual $V_i$ is obtained by weighting a random mutated individual $V_{rand1}$ and a neighborhood-best mutated individual $V_{local\_best}$ through the weighting factor w, $w \in [0,1]$, F is a scaling factor, and $X_{local\_best}$ is the best neighbor within an index range of the individual $X_i$.

5. The image registration method using an FDESAC algorithm based on historical records according to claim 1, wherein in step 10, the expression for calculating the weighting factor average value $\mu w$ is as follows:

$$\mu w = (1 - 0.1.) * \mu w + 0.1 * avg.$$

6. The image registration method using an FDESAC algorithm based on historical records according to claim 1, wherein in step 12, the entire iteration process is divided into an archive recording phase and an archive application phase, and the division point between the two phases is a maximum sample inlier record max($a_s$)=NP;

for the archive recording phase, an approach of testing the individual $X_i$ through the test function Test is pretest+global test;

for the archive application phase, an approach of testing the individual $X_i$ through the test function Test is pretest+fast test;

during execution of the fast test, if the sample inlier record $a_{s,i}$ of the sample $s_i$ is 0, the test thereof is directly skipped, and the sample is directly determined as an outlier; and during the archive application phase, when the population iteration count satisfies iter % uT=0, pretest+fast test is not performed; instead, pretest+global test is performed.

7. The image registration method using an FDESAC algorithm based on historical records according to claim 1, wherein the model inlier archive $A_M$ is updated when samples are drawn to generate a hypothesis model, namely, during population initialization;

first, the algorithm randomly draws m samples from superior samples within a top BP*100% range to construct a minimum sample subset $S_{min} = \{s_{x1}, s_{x2}, \ldots, s_{xmn}\}$, wherein m is the minimum number of samples required to construct the model; then, a hypothesis model X is generated by using $S_{min}$ and is verified so as to obtain the inlier count Inlier(X); and finally, for each sample $s_{xi}$ participating in construction of the hypothesis model X, the update expression for the model inlier record $a_{m,xi}$ corresponding thereto is as follows:

$$a_{m,xi} = a_{m,xi} + \mathrm{Inlier}(X).$$

8. The image registration method using an FDESAC algorithm based on historical records according to claim 1, wherein in step 4, the SIFT feature distance ratio $D_r$ is set to 0.8, and an inlier determination error threshold t is set to 5 pixels.

9. The image registration method using an FDESAC algorithm based on historical records according to claim 1, wherein the evaluation indexes EI comprise two indexes: an inlier count and an inlier error.

\* \* \* \* \*